(12) United States Patent
Chen et al.

(10) Patent No.: US 12,250,395 B2
(45) Date of Patent: Mar. 11, 2025

(54) INTERACTION BETWEEN REFERENCE PICTURE RESAMPLING AND TEMPLATE-BASED INTER PREDICTION TECHNIQUES IN VIDEO CODING

(71) Applicant: QUALCOMM Incorporated, San Diego, CA (US)

(72) Inventors: Chun-Chi Chen, San Diego, CA (US); Han Huang, San Diego, CA (US); Zhi Zhang, Munich (DE); Yao-Jen Chang, San Diego, CA (US); Yan Zhang, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 18/057,500

(22) Filed: Nov. 21, 2022

(65) Prior Publication Data
US 2023/0199211 A1  Jun. 22, 2023

Related U.S. Application Data

(60) Provisional application No. 63/265,555, filed on Dec. 16, 2021.

(51) Int. Cl.
*H04N 19/503* (2014.01)
*H04N 19/105* (2014.01)
(Continued)

(52) U.S. Cl.
CPC ......... *H04N 19/503* (2014.11); *H04N 19/105* (2014.11); *H04N 19/109* (2014.11);
(Continued)

(58) Field of Classification Search
None
See application file for complete search history.

(56) References Cited

U.S. PATENT DOCUMENTS

2022/0046271 A1\* 2/2022 Chen ...................... H04N 19/70
2022/0060692 A1\* 2/2022 Zhang .................. H04N 19/103
(Continued)

FOREIGN PATENT DOCUMENTS

WO  2020228659 A1  11/2020
WO  2020232269 A1  11/2020

OTHER PUBLICATIONS

Alshina E., et al., "EE1-2.1: Super Resolution with Existing VVC Functionality", JVET-Y0061-v2, Joint Video Experts Team (JVET) of ITU-T SG 16 WP 3 and ISO/IEC JTC 1/SC 29, 25th Meeting, by teleconference, Jan. 12-21, 2022, pp. 1-3.
(Continued)

*Primary Examiner* — Chikaodili E Anyikire
(74) *Attorney, Agent, or Firm* — Shumaker & Sieffert, PA

(57) ABSTRACT

A video encoder and video decoder may determine to enable or disable a template-based inter prediction technique based on whether reference picture resampling or weighted prediction are used. A video encoder and video decoder may determine that a reference picture resampling mode is enabled. determine not to apply a template-based inter prediction technique to the video data based on the reference picture resampling mode being enabled, and code the video data using inter prediction without applying the template-based inter prediction technique.

20 Claims, 12 Drawing Sheets

(51) Int. Cl.
    *H04N 19/109*    (2014.01)
    *H04N 19/132*    (2014.01)
    *H04N 19/159*    (2014.01)
    *H04N 19/172*    (2014.01)
    *H04N 19/176*    (2014.01)
(52) U.S. Cl.
    CPC ......... *H04N 19/132* (2014.11); *H04N 19/159* (2014.11); *H04N 19/172* (2014.11); *H04N 19/176* (2014.11)

(56) References Cited

U.S. PATENT DOCUMENTS

2022/0132111 A1* 4/2022 Liu ..................... H04N 19/117
2022/0264086 A1* 8/2022 Zhang ................ H04N 19/105

OTHER PUBLICATIONS

Bordes P., et al., "EE2-Related: Bug Fixes for Enabling RPR in ECM", 136. MPEG Meeting, Oct. 6, 2021-Oct. 15, 2021, Online, (Motion Picture Expert Group or ISO/IEC JTC1/SC29/WG11), No. m57921, JVET-X0121-v1, Sep. 30, 2021 (Sep. 30, 2021), XP030297717, pp. 1-3, Retrieved from the Internet: URL: https://dms.mpeg.expert/doc_end_user/documents/136_Teleconference/wg11/m57921-JVET-X0121-v1-JVET-X0121-v1.zip JVET-X0121-v1.docx [retrieved on Sep. 30, 2021].

Bossen F., et al., "VTM Software Manual", JVET-Software Manual, Joint Video Experts Team (JVET) of ITU-T SG16 WP3 and ISO/IEC JTC1/SC29/WG11, Date saved: Feb. 5, 2019, pp. 1-34.

Bross B., et al., "Versatile Video Coding Editorial Refinements on Draft 10", JVET-T2001-v2, 20. JVET Meeting, Oct. 7, 2020-Oct. 16, 2020, Teleconference, (The Joint Video Experts Team of ISO/IEC JTC1/SC29/WG11 and ITU-T SG 16), Nov. 24, 2020 (Nov. 24, 2020), pp. 1-515, XP030293334.

Chang T-S (Alibaba-Inc)., et al., "AHG8: Support for Reference Picture Resampling—Handling of Resampling, TMVP, DMVR, and BDOF," 15. JVET Meeting, Jul. 3, 2019-Jul. 12, 2019, Gothenburg; (The Joint Video Exploration Team of ISO/IEC JTC1/SC29/WG11 and ITU-TSG. 16), No. JVET-O0134-v2, Jun. 30, 2019 (Jun. 30, 2019), XP030218711, 4 pages.

Chen J., et al., "Algorithm Description for Versatile Video Coding and Test Model 11 (VTM 11)", JVET-T2002-v2, Joint Video Experts Team (JVET) of ITU-T SG 16 WP 3 and ISO/IEC JTC 1/SC 29, 20th Meeting, by teleconference, Oct. 7-16, 2020, pp. 1-101.

Chen J., et al., "Algorithm Description for Versatile Video Coding and Test Model 4 (VTM 4)", 13th JVET Meeting, Jan. 9, 2019-Jan. 18, 2019, Marrakech, (The Joint Video Exploration Team of ISO/IEC JTC1/SC29/WG11 and ITU-T SG.16 WP3), No. JVET-M1002-v2, Mar. 19, 2019 (Mar. 19, 2019), XP030255391, pp. 1-62.

Chen J., et al., "Algorithm Description of Joint Exploration Test Model 7 (JEM7)", 119 . Mpeg Meeting, 7. JVET Meeting, Jul. 13, 2017-Jul. 21, 2017, JVET-G1001-V1, Joint Video Exploration Team (JVET) of ITU-T SG 16 WP3 and ISO/IEC JTC 1/SC 29/WG 11, No. m41357, No. G1001_v1, JVET-G1001, 7th Meeting, Jul. 13, 2017-Jul. 21, 2017, Torino, IT, Aug. 19, 2017, XP030150980, 48 Pages.

Coban M., et al., "Algorithm Description of Enhanced Compression Model 2 (ECM 2)", 23rd, MPEG Meeting, Jul. 7, 2021-Jul. 16, 2021, Online, (Motion Picture Expert Group or ISO/IEC JTC1/SC29/WG11), No. M57745, JVET-W2025, Sep. 1, 2021, XP030297803, pp. 1-22.

Coban M., et al., "Algorithm Description of Enhanced Compression Model 3 (ECM 3)", JVET-X2025-v2, Joint Video Experts Team (JVET) of ITU-T SG 16 WP 3 and ISO/IEC JTC 1/SC 29, 23rd Meeting, by teleconference, Jul. 7-16, 2021, pp. 1-28.

Fujibayashi A., et al., "TE12: Performance of Partition Based Illumination Compensation (PBIC)", 3rd JCT-VC Meeting, 94th MPEG Meeting, Oct. 7, 2010-Oct. 15, 2010, 3rd Meeting: Guangzhou, CN, (Joint Collaborative Team on Video Coding of ISO/IEC JTC1/SC29/WG11 and ITU-T SG.16), WG-11No. m18062, URL: http://WFTP3.ITU.INT/AV-ARCH/JCTVC-SITE/, No. JCTVC-C041, Oct. 1, 2010 (Oct. 1, 2010), XP030007748, pp. 1-12.

Huang H., et al., "EE2: Adaptive Decoder Side Motion Vector Refinement (Test 3.4)", JVET-X0049-v1, Joint Video Experts Team (JVET) of ITU-T SG 16 WP 3 and ISO/IEC JTC 1/SC 29, 24th Meeting, by teleconference, Oct. 6-15, 2021, pp. 1-3.

International Search Report and Written Opinion—PCT/US2022/080331—ISA/EPO—Feb. 15, 2023.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Karczewicz M., et al., "Common Test Conditions and Evaluation Procedures for Enhanced Compression Tool Testing", JVET-V2017-v1, Joint Video Experts Team (JVET) of ITU-T SG 16 WP 3 and ISO/IEC JTC 1/SC 29, 22nd Meeting, by teleconference, Apr. 20-28, 2021, pp. 1-7.

Luo J., et al., "JVET Functionality Confirmation Test Condition for reference Picture Resampling", JVET-Q2015-v2, Joint Video Experts Team (JVET) of ITU-T SG 16 WP 3 and ISO/IEC JTC 1/SC 29/WG 11, 17th Meeting, Brussels, BE, Jan. 7-17, 2020, pp. 1-2.

Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, XP011487803, pp. 1649-1668.

Wang Y-K., et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages.

Zhang Z., et al., "EE2: Bilateral and Template Matching AMVP-Merge Mode (Test 3.3)", JVET-X0083-v1, Joint Video Experts Team (JVET) of ITU-T SG 16 WP 3 and ISO/IEC JTC 1/SC 29, 24th Meeting, by teleconference, Oct. 6-15, 2021, pp. 1-3.

Zhang Z., et al., "Non-EE2: Fixing Issues for RPR Enabling and Non-CTC Configuration in ECM", JVET-Y0128-v4, Joint Video Experts Team (JVET) of ITU-T SG 16 WP 3 and ISO/IEC JTC 1/SC 29, 25th Meeting, by teleconference, Jan. 12-21, 2022, pp. 1-5.

"Fix RPR_ENABLE for TMVP when all ref are scaled and with X0049,X0083", Retrieved from: https://vcgit.hhi.fraunhofer.de/ecm/ECM/-/merge_requests/47, Accessed on: Feb. 24, 2023, 3 pp.

* cited by examiner

INTERACTION BETWEEN REFERENCE PICTURE RESAMPLING AND TEMPLATE-BASED INTER PREDICTION TECHNIQUES IN VIDEO CODING

This application claims the benefit of U.S. Provisional Application No. 63/265,555 filed Dec. 16, 2021, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for coding video data. In particular, this disclosure describes techniques related to handling the interaction between reference picture resampling (RPR) and/or weighted prediction (WP) and template-based inter prediction techniques. Template-based inter prediction techniques may include local illumination compensation (LIC) and/or template matching (TM) inter-prediction. In particular, this disclosure describes techniques that including disabling the use of template-based inter prediction techniques in certain circumstances where RPR or WP are enabled for coding video data. The techniques of this disclosure may reduce the computational complexity of implementing template-based inter prediction techniques together with RPR or WP. In addition, the techniques of this disclosure may improve coding efficiency in situations where RPR or WP are enabled.

The techniques of this disclosure may be applied as extensions to any existing video codecs, such as HEVC (High Efficiency Video Coding), VVC (Versatile Video Coding), and Essential Video Coding (EVC), or be an efficient coding tool in future video coding standards.

In one example, this disclosure describes a method of decoding video data, the method comprising determining that an RPR mode is enabled, determining not to apply a template-based inter prediction technique to the video data based on the RPR mode being enabled, and decoding the video data using inter prediction without applying the template-based inter prediction technique.

In another example this disclosure describes an apparatus configured to decode video data, the apparatus comprising a memory configured to store the video data, and one or more processors implemented in circuitry and in communication with the memory, the one or more processors configured to determine that an RPR mode is enabled, determine not to apply a template-based inter prediction technique to the video data based on the RPR mode being enabled, and decode the video data using inter prediction without applying the template-based inter prediction technique.

In another example, this disclosure describes an apparatus configured to decode video data, the apparatus comprising means for determining that an RPR mode is enabled, means for determining not to apply a template-based inter prediction technique to the video data based on the RPR mode being enabled, and means for decoding the video data using inter prediction without applying the template-based inter prediction technique.

In another example this disclosure a non-transitory computer-readable storage medium storing instructions that, when executed, causes one or more devices configured to decode video data to determine that an RPR mode is enabled, determine not to apply a template-based inter prediction technique to the video data based on the RPR mode being enabled, and decode the video data using inter prediction without applying the template-based inter prediction technique.

In another example, this disclosure describes a method of encoding video data, the method comprising determining that an RPR mode is enabled, determining not to apply a template-based inter prediction technique to the video data based on the RPR mode being enabled, and encoding the video data using inter prediction without applying the template-based inter prediction technique.

In another example this disclosure describes an apparatus configured to encode video data, the apparatus comprising a memory configured to store the video data, and one or more processors implemented in circuitry and in communication with the memory, the one or more processors configured to determine that an RPR mode is enabled, determine not to apply a template-based inter prediction technique to the video data based on the RPR mode being enabled, and encode the video data using inter prediction without applying the template-based inter prediction technique.

In another example, this disclosure describes an apparatus configured to encode video data, the apparatus comprising means for determining that an RPR mode is enabled, means for determining not to apply a template-based inter prediction technique to the video data based on the RPR mode being enabled, and means for encoding the video data using inter prediction without applying the template-based inter prediction technique.

In another example this disclosure a non-transitory computer-readable storage medium storing instructions that, when executed, causes one or more devices configured to encode video data to determine that an RPR mode is enabled, determine not to apply a template-based inter prediction technique to the video data based on the RPR mode being enabled, and encode the video data using inter prediction without applying the template-based inter prediction technique.

The details of one or more examples are set forth in the accompanying drawings and the description below. Other features, objects, and advantages will be apparent from the description, drawings, and claims.

DETAILED DESCRIPTION

Video coders (e.g., encoders and decoders) may be configured to code video data using various inter prediction modes that may interact with other coding modes in a negative or unexpected way. For example, certain template-based inter prediction techniques may become more complex to implement or may lose coding efficiency when applied together with coding techniques that involve scaling processes on a reference picture. Example template-based coding techniques may included local illumination compensation (LIC) and/or template matching (TM) inter prediction. Example video coding techniques that include the scaling of reference pictures may include reference picture resampling (RPR) and/or weighted prediction (WP).

In some example video codecs, the respective processes of template-based inter prediction techniques (e.g., LIC and TM inter prediction) are not completely defined when RPR and/or WP are used. As such, video coding processes using both template-based inter prediction techniques and RPR/WP may be more complex to implement and/or provide for sub-optimal coding efficiency.

This disclosure describes techniques for coding video data. In particular, this disclosure describes techniques related to handling the interaction between RPR and/or WP and template-based inter prediction techniques. In particular, this disclosure describes techniques that including disabling the use of template-based inter prediction techniques in certain circumstances where RPR or WP are enabled for coding video data. The techniques of this disclosure may reduce the computational complexity of implementing template-based inter prediction techniques together with RPR or WP. In addition, the techniques of this disclosure may improve coding efficiency in situations where RPR or WP are enabled.

Figure 1:
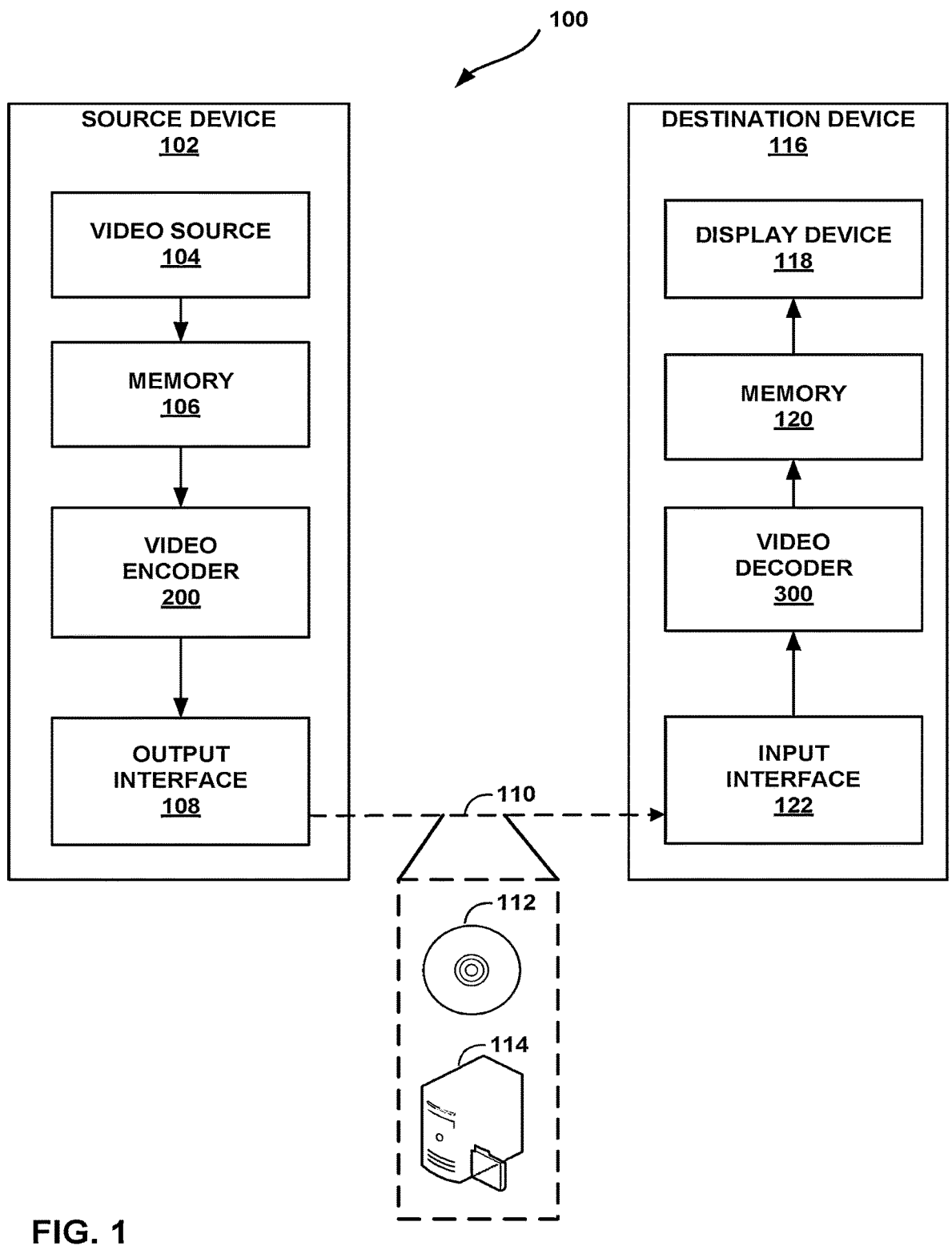
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for coding video data using reference picture resampling and template based inter prediction techniques. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for using reference picture resampling and template based inter prediction techniques. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use reference picture resampling and template based inter prediction techniques.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling"

may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

As will be described in more detail below, the techniques of this disclosure relate handling the interaction between reference picture resampling (RPR) and template-based inter prediction techniques (e.g., template matching and local illumination compensation (LIC)). The techniques of this discloser may be applied as extensions to any of the existing video codecs, such as HEVC (High Efficiency Video Coding), VVC (Versatile Video Coding), Essential Video Coding (EVC), or be an efficient coding tool in future video coding standards. In a general example, video encoder 200 and video decoder may be configured to determine that an RPR mode is enabled, determine not to apply a template-based inter prediction technique to the video data based on the RPR mode being enabled, and decode the video data using inter prediction without applying the template-based inter prediction technique.

CU Structure and Motion Vector Prediction

In some video coding processes (e.g., HEVC), the largest coding unit (LCU) in a slice is called a coding tree block (CTB) or coding tree unit (CTU). A CTB contains a quad-tree, the nodes of which are called coding units (CUs).

The size of a CTB can range from 16×16 samples to 64×64 samples in the HEVC main profile (although technically 8×8 CTB sizes can be supported). A CU may be the same size as a CTB to as small as 8×8 samples. Each CU is coded with a coding mode (e.g., inter, intra, or another coding mode). When a CU is inter coded, the CU may be further partitioned into two or four prediction units (PUs) or may become just one PU when further partitioning does not apply. When two PUs are present in one CU, the two PUs can be half size rectangles or two rectangles having sizes that are ¼ or ¾ the size of the CU.

When the CU is inter coded, each PU has one set of motion information, which video decoder 300 may derived with a unique inter prediction mode.

Motion Vector Prediction

In some video coding processes (e.g., HEVC), there are two inter prediction modes, named merge (skip is considered as a special case of merge) and advanced motion vector prediction (AMVP) modes, respectively, for a PU.

In either AMVP or merge mode, a motion vector (MV) candidate list is maintained for multiple motion vector predictors. The motion vector(s), as well as reference indices in the merge mode, of the current PU are generated by taking one candidate from the MV candidate list.

The MV candidate list includes up to five candidates for the merge mode and only two candidates for the AMVP mode. A merge candidate may include a set of motion information, e.g., motion vectors corresponding to both reference picture lists (list 0 and list 1) and the reference indices. If a merge candidate is identified by a merge index, the reference pictures used for the prediction of the current blocks, as well as the associated motion vectors are determined. On the other hand, under AMVP mode, for each potential prediction direction from either list 0 or list 1, a reference index is explicitly signaled, together with an MV predictor (MVP) index to the MV candidate list since the AMVP candidate contains only a motion vector. In AMVP mode, the predicted motion vectors can be further refined.

The candidates for both merge and AMVP modes are derived similarly from the same spatial and temporal neighboring blocks.

Spatial Neighboring Candidates

Figure 2:
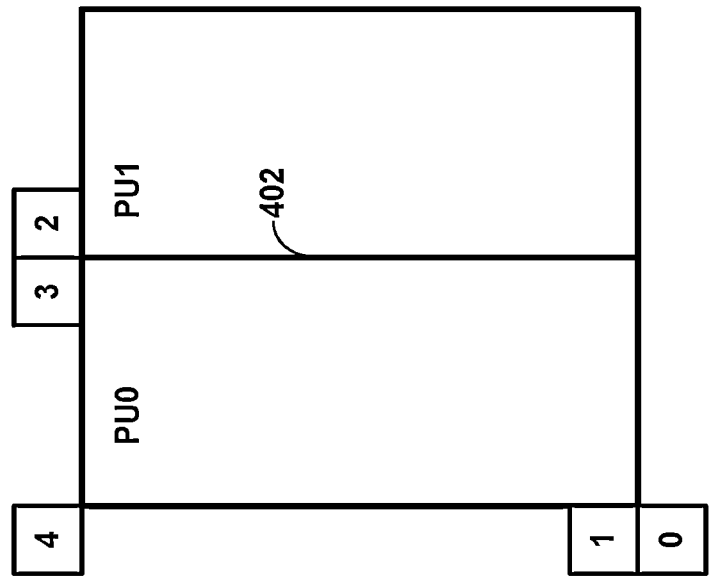
FIG. 2 illustrates spatial neighboring motion vector candidates for example merge and advanced motion vector prediction modes.
Figure 2:
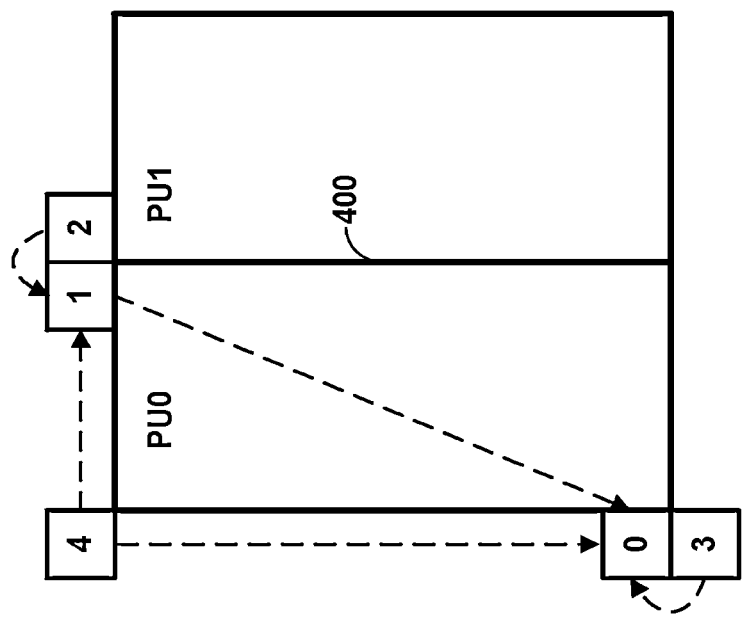

As shown in FIG. 2, spatial MV candidates are derived from the neighboring blocks for a specific PU (PU$_0$), although the methods for generating the candidates from the blocks differ for merge and AMVP modes.

In merge mode, up to four spatial MV candidates can be derived for PU0 400 using the order shown in FIG. 2. The order is the following: left neighboring block (0, A1), above neighboring block (1, B1), above right neighboring block (2, B0), below left neighboring block (3, A0), and above left neighboring block (4, B2), as shown in FIG. 2.

In AVMP mode, the neighboring blocks of PU0 402 are divided into two groups: a left group including neighboring blocks 0 and 1, and an above group including neighboring blocks 2, 3, and 4. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate, thus the temporal distance differences can be compensated.

Temporal Motion Vector Prediction

A temporal motion vector predictor (TMVP) candidate, if enabled and available, is added into the MV candidate list after spatial motion vector candidates. The process of motion vector derivation for a TMVP candidate is the same for both merge and AMVP modes. However, the target reference index for the TMVP candidate in the merge mode is always set to 0.

Figure 3:
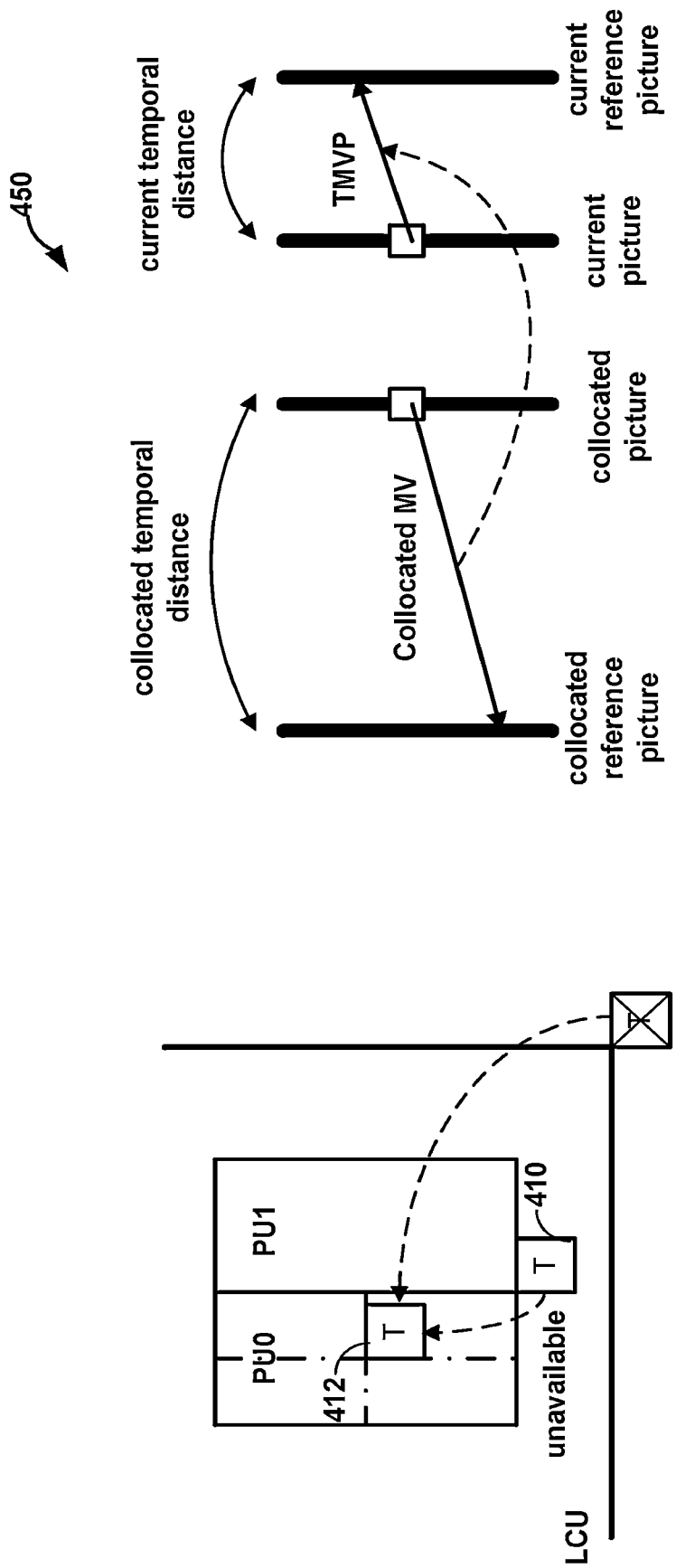
FIG. 3 illustrates examples of temporal motion vector predictor candidates and motion vector scaling.

The primary block location for TMVP candidate derivation is the bottom right block outside of the collocated PU, shown in FIG. 3 as a block 410 ("T"), to compensate the bias to the above and left blocks used to generate spatial neighboring candidates. However, if that block is located outside of the current CTB row or motion information is not available, the block is substituted with a center block 412 of the PU.

The motion vector for a TMVP candidate is derived from the co-located PU of the co-located picture, indicated at the slice level. The motion vector for the co-located PU is called a collocated MV.

Similarly to temporal direct mode in AVC, to derive the TMVP candidate motion vector, the co-located MV may be scaled to compensate the temporal distance differences, as shown in process 450 of FIG. 3.

Other Aspects of Motion Prediction

Several other aspects of merge and AMVP modes are described below.

Motion vector scaling: It is assumed that the value of motion vectors is proportional to the distance of pictures in the presentation time. A motion vector associates two pictures: the reference picture and the picture containing the motion vector (namely the containing picture). When a motion vector is utilized to predict the other motion vector, the distance of the containing picture and the reference picture is calculated based on Picture Order Count (POC) values.

For a motion vector to be predicted, both its associated containing picture and reference picture may be different.

Therefore, a new distance (based on POC) is calculated. The motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Artificial motion vector candidate generation: If a motion vector candidate list is not complete (e.g., includes less than a predetermined maximum number of candidates), artificial motion vector candidates are generated and inserted at the end of the list until the list has the maximum number of candidates.

In merge mode, there are two types of artificial MV candidates: a combined candidate derived only for B-slices and zero candidates used only for AMVP if the first type does not provide enough artificial candidates.

For each pair of candidates that are already in the candidate list and have the necessary motion information, bi-directional combined motion vector candidates are derived by a combination of the motion vector of the first candidate referring to a picture in list 0 and the motion vector of a second candidate referring to a picture in list 1.

Pruning process for candidate insertion: Candidates from different blocks may happen to be the same, which decreases the efficiency of a merge/AMVP candidate list. A pruning process is applied to address this problem. The pruning process compares one candidate against the others in the current candidate list to avoid inserting identical candidates. To reduce the complexity, only a limited number of pruning processes are applied instead of comparing each potential candidate with all the other existing candidates.

Reference Picture Resampling

In some video coding processes (e.g., HEVC), the spatial resolution of pictures cannot change unless a new sequence using a new sequence parameter set (SPS) starts with an intra random access point (IRAP) picture. VVC enables picture resolution changes within a sequence at a position without encoding an IRAP picture, which is always intra-coded. This feature is sometimes referred to as reference picture resampling (RPR), as RPR includes resampling of a reference picture used for inter prediction when that reference picture has a different resolution than the current picture being decoded. In order to avoid additional processing steps, the RPR process in VVC is designed to be embedded in the motion compensation process and performed at the block level. In the motion compensation stage, a scaling ratio is used together with motion information to locate the reference samples in the reference picture to be used in the interpolation process.

In VVC, the scaling ratio is restricted to be larger than or equal to 1/2 (2 times down-sampling from the reference picture to the current picture), and less than or equal to 8 (8 times up-sampling). Three sets of resampling filters with different frequency cutoffs are specified to handle various scaling ratios between a reference picture and the current picture. The three sets of resampling filters are applied, respectively, for the scaling ratios ranging from 1/2 to 1/1.75, from 1/1.75 to 1/1.25, and from 1/1.25 to 8.

Each set of resampling filters has 16 phases for luma components and 32 phases for chroma components, which is same to the case of motion compensation interpolation filters. The filter set of normal motion compensation interpolation is used in the case of scaling ratio ranging from 1/1.25 to 8. Actually, the normal motion compensation interpolation process may be considered a special case of the resampling process with scaling ratio ranging from 1/1.25 to 8. In addition to conventional translational block motion, the affine mode has three sets of 6-tap interpolation filters that are used for the luma component to cover the different scaling ratios in RPR. The horizontal and vertical scaling ratios are derived based on picture width and height, and the left, right, top and bottom scaling offsets specified for the reference picture and the current picture.

For support of this feature, the picture resolution and the corresponding conformance window are signalled in the picture parameter set (PPS) instead of in the SPS, while the maximum picture resolution is signalled in the SPS.

Weighted Prediction

In some video coding processes (e.g., HEVC), Weighted Prediction (WP) is supported, where a scaling factor (denoted by a), a shift number (denoted by s), and an offset (denoted by b) is used in the motion compensation process. For a pixel value in position (x, y) of the reference picture p(x, y), the function p'(x, y)=((a*p(x, y)+(1<<(s−1)))>>s)+b instead of p(x, y) is used as the prediction value in motion compensation.

When WP is enabled, for each reference picture of current slice, video encoder 200 signals a flag to indicate whether WP applies for the reference picture or not. If WP applies for one reference picture, a set of WP parameters (e.g., a, s and b) is sent to video decoder 300 and is used for motion compensation from the reference picture. To flexibly turn on/off WP for luma and chroma component, the WP flag and WP parameters are separately signaled for luma and chroma component.

In one example of WP, one same set of WP parameters is used for all pixels in one reference picture.

Local Illumination Compensation (IC) in HEVC

In one example process, a partition-based illumination compensation (PBIC) is used. Different from weighted prediction (WP), which is enabled/disabled for use, and parameters are signaled, at the slice level, PBIC is enabled/disabled and its model parameters are signaled at the PU level to handle local illumination variation.

Similar to WP, illumination compensation also has a scaling factor (also denoted by a) and an offset (also denoted by b), and the shift number is fixed to be 6. An IC flag is coded for each PU to indicate whether IC applies for current PU or not. If IC applies for the PU, a set of IC parameters (e.g., a and b) are signaled to video decoder 300 and are used for motion compensation. In the bi-prediction case, two scaling factors (one for each prediction direction) and one offset are signaled.

In one example, to save bits spent on IC parameters, the chroma components shares the scaling factors with the luma components and a fixed offset 128 is used.

Local Illumination Compensation in 3D-HEVC

In 3D-HEVC, IC is enabled for inter-view prediction. Different from WP and PBIC, which signals IC parameters explicitly, 3D-HEVC includes deriving IC parameters based on neighboring samples of a current CU and neighboring samples of a reference block.

IC applies to a 2N×2N partition mode only. For AMVP mode, one IC flag is signaled for each CU that is predicted from an inter-view reference picture. For merge mode, to save bits, an IC flag is signaled only when merge index of the PU is not equal to 0. In one example, IC does not apply to CU that is only predicted from temporal reference pictures.

A linear IC model used in inter-view prediction is shown in Eq. (1):

$$p(i,j) = a * r(i+dv_x, j+dv_y+b), \text{ where } (i,j) \in PU_c \qquad (1)$$

Here, $PU_c$ is the current PU, (i, j) is the coordinate of pixels in $PU_c$, $(dv_x, dv_y)$ is the disparity vector of $PU_c$. p(i, j) is the prediction of $PU_c$, r is the PU's reference picture from neighboring view, and a and b are parameters of the linear IC model.

Figure 4:
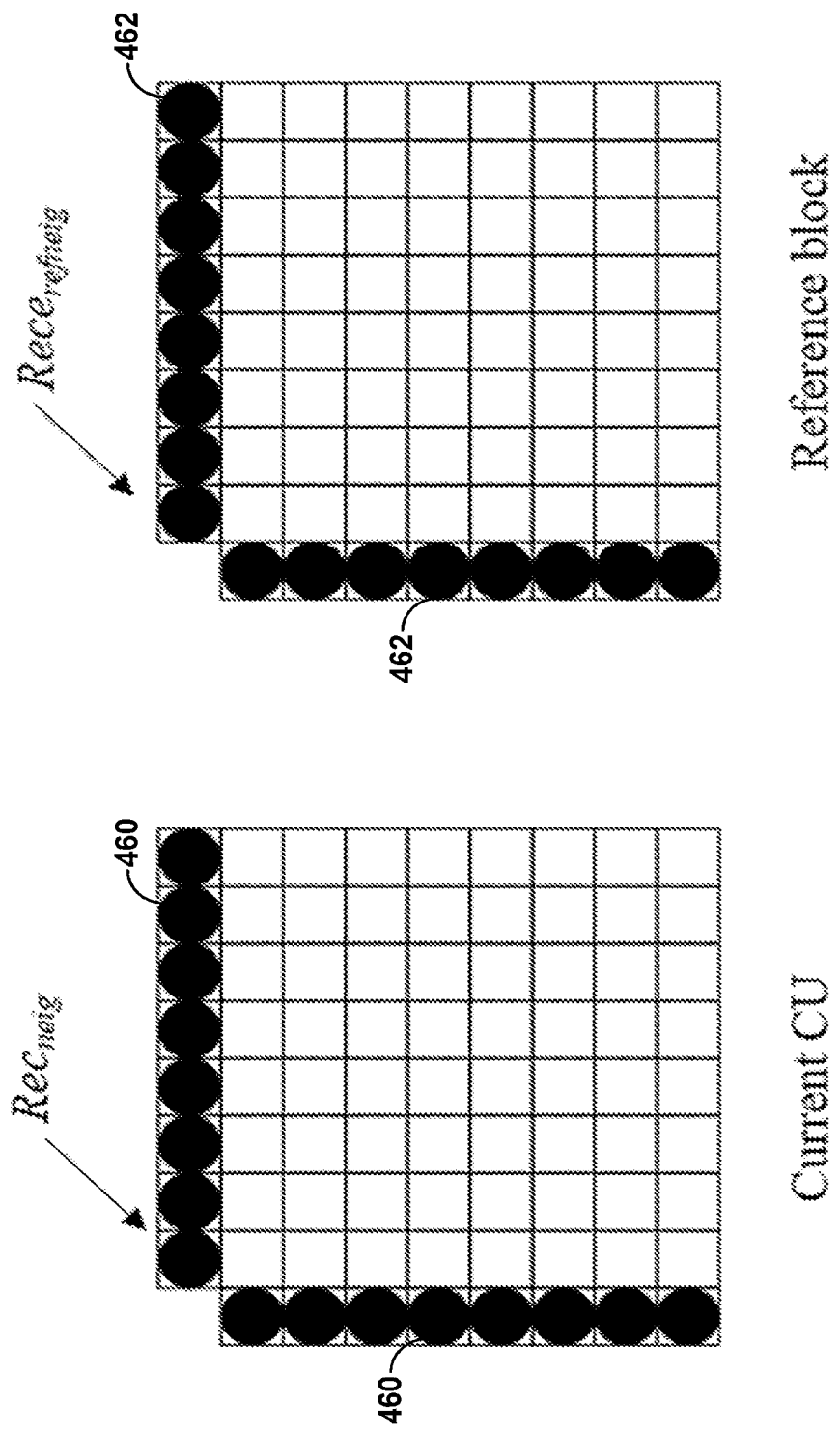
FIG. 4 illustrates example neighboring samples for an illumination compensation model.

To estimate parameters a and b for a PU, two set of pixels, as shown in FIG. 4, are used. A first set of pixels are the available reconstructed neighboring pixels ($Rec_{neig}$) 460 in the left column and the above row of current CU 460 (the CU that contains current PU). A second set of pixels are the corresponding neighboring pixels ($Rec_{refneig}$) 462 of current CU's reference block. A reference block of the current CU is found by using current PU's disparity vector.

Let $Rec_{neig}$ and $Rec_{refneig}$ denote a neighboring pixel set of the current CU and its reference block, respectively, and let 2N denote the pixel number in $Rec_{neig}$ and $Rec_{refneig}$. Then, a and b can be calculated as:

$$a = \frac{2N \cdot \sum_{i=0}^{2N-1} Rec_{neig}(i) \cdot Rec_{refneig}(i) - \sum_{i=0}^{2N-1} Rec_{neig}(i) \cdot \sum_{i=0}^{2N-1} Rec_{refneig}(i)}{2N \cdot \sum_{i=0}^{2N-1} Rec_{refneig}(i) \cdot Rec_{refneig}(i) - \left(\sum_{i=0}^{2N-1} Rec_{refneig}(i)\right)^2} \quad (2)$$

$$b = \frac{\sum_{i=0}^{2N-1} Rec_{neig}(i) - a \cdot \sum_{i=0}^{2N-1} Rec_{refneig}(i)}{2N} \quad (3)$$

In some cases, only a is used in the linear model and b is always set equal to 0, or only b is used and a is always set equal to 1.

Local Illumination Compensation in JVET

Local Illumination Compensation (LIC) is based on a linear model for illumination changes, using a scaling factor a (with a shift number fixed to be 6) and an offset b. In one example, LIC is enabled or disabled adaptively for each inter-mode coded CU.

Figure 5:
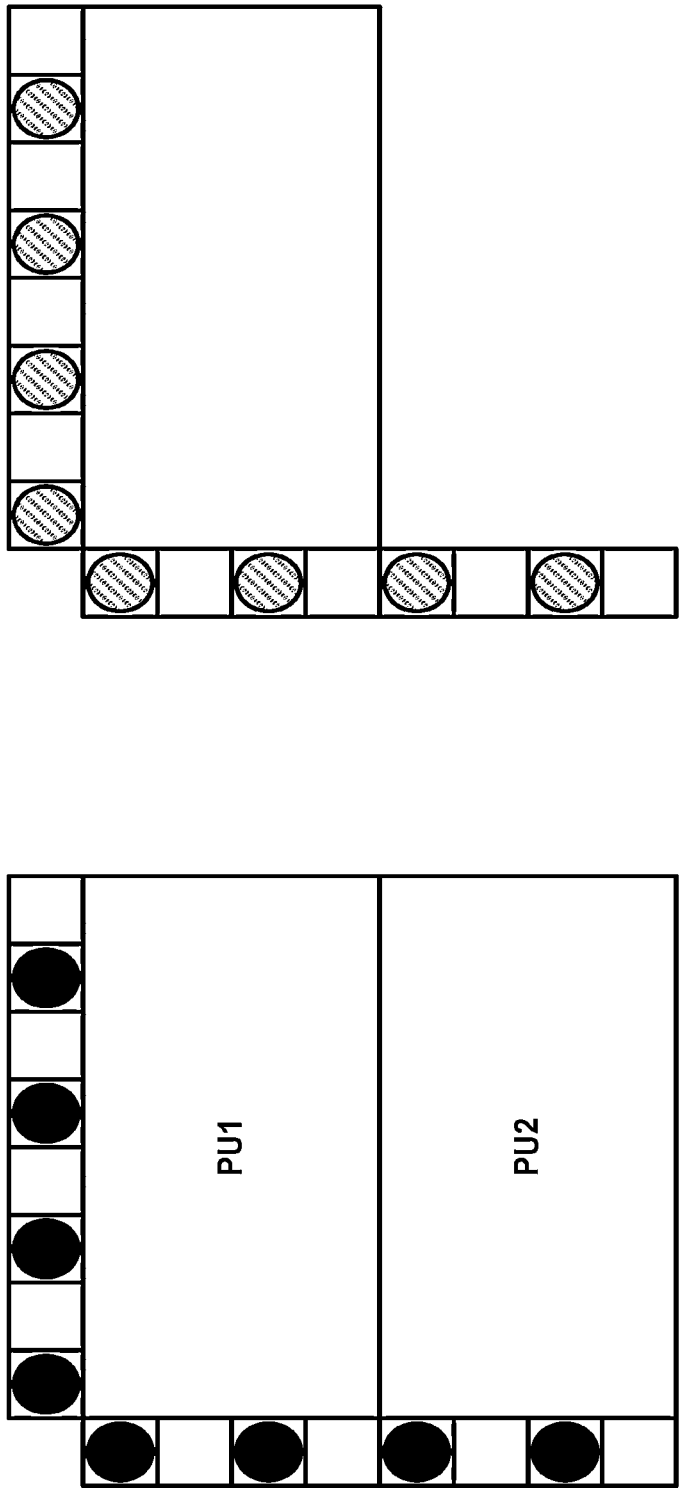
FIG. 5 illustrates another example of neighboring samples for an illumination compensation model.

When LIC applies for a CU, a least square error method is employed to derive the parameters a and b by using the neighbouring samples of the current CU and their corresponding reference samples. More specifically, as illustrated in FIG. 5, the subsampled (2:1 subsampling) neighbouring samples 500 of the CU and the corresponding pixels 502 (identified by motion information of the current CU or sub-CU) in the reference picture are used. The IC parameters are derived and applied for each prediction direction separately.

When a CU is coded with merge mode, the LIC flag is copied from neighbouring blocks, in a way similar to motion information copy in merge mode; otherwise, an LIC flag is signalled for the CU to indicate whether LIC applies or not.

Template Matching Prediction

Template matching (TM) prediction is a special merge mode based on Frame-Rate Up Conversion (FRUC) techniques. With this mode, motion information of a block is not signalled, but is derived at video decoder 300. TM may be applied to both AMVP mode and regular merge mode. In AMVP mode, MVP candidate selection is determined based on template matching to pick the MVP candidate which results in the smallest difference between a current block template and a reference block template. In regular merge mode, a TM mode flag is signalled to indicate the use of TM and then TM is applied to the merge candidate indicated by merge index for MV refinement.

Figure 6:
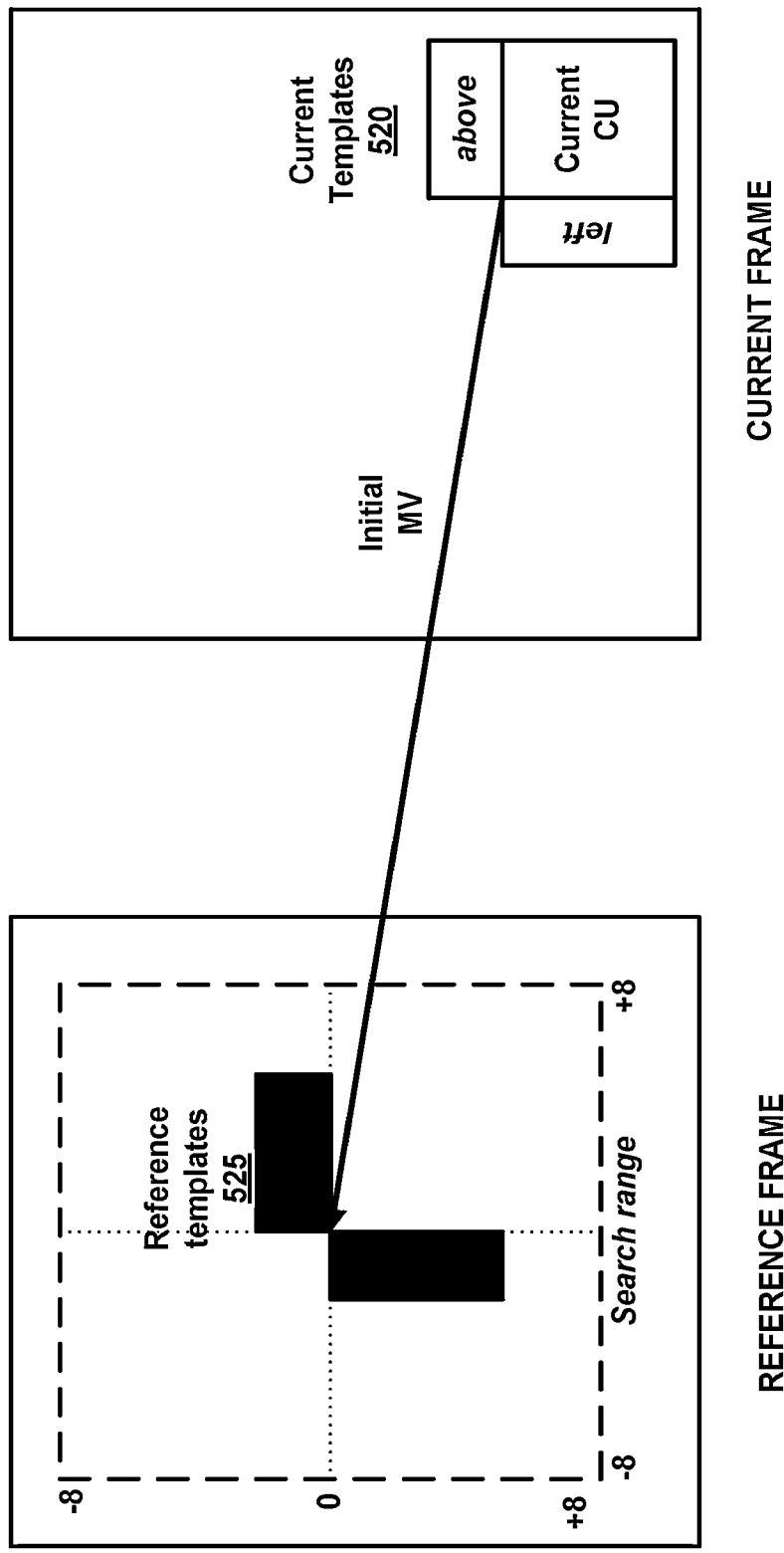
FIG. 6 illustrates an example of template matching.

As shown in FIG. 6, template matching is used to derive motion information of the current CU by finding the closest match between current templates 520 (top and/or left neighbouring blocks of the current CU) in the current picture and a block (e.g., reference templates 525 that are the same size as current templates 520) in a reference picture. With an AMVP candidate selected based on initial matching error, its MVP is refined by template matching. With a merge candidate indicated by signaled merge index, its merged MVs corresponding to L0 and L1 are refined independently by template matching and then the less accurate MV is further refined again with the better MV as a prior.

Cost function: When a motion vector points to a fractional sample position, motion compensated interpolation is used. To reduce complexity, bi-linear interpolation instead of regular 8-tap DCT-IF interpolation is used for template matching to generate templates on reference pictures. The matching cost C of template matching is calculated as follows:

$$C = SAD + w \cdot (|MV_x - MV_x^s| + |MV_y - MV_y^s|),$$

where w is a weighting factor which is empirically set to 4, MV and $MV^s$ indicates the currently tested MV and the initial MV (i.e., a MVP candidate in AMVP mode or merged motion in merge mode), respectively. SAD is used as the matching cost of template matching.

When TM is used, motion is refined by using luma samples only. The derived motion will be used for both luma and chroma for motion compensation inter prediction. After the MV is decided, a final motion compensation is performed using 8-taps interpolation filter for luma and 4-taps interpolation filter for chroma.

Search method: MV refinement is a pattern-based MV search with the criterion of template matching cost and a hierarchical structure. Two search patterns are supported—a diamond search and a cross search for MV refinement. The hierarchical structure specifies an iterative process to refine MV, starting at a coarse MVD precision (e.g., quarter-pel) and ending at a fine MVD precision (e.g., ⅛-pel). The MV is directly searched at quarter luma sample MVD precision with diamond pattern, followed by quarter luma sample MVD precision with cross pattern. This is followed by one-eighth luma sample MVD refinement with a cross pattern. The search range of MV refinement is set equal to (−8, +8) luma samples around the initial MV. When the current block is of bi-prediction, both MVs are refined independently, and then the best of which (in terms of matching cost) is set as a prior to further refine the other MV with BCW weight values.

Problems

The respective processes of template-based inter prediction techniques (e.g., LIC and TM inter prediction) described above are not completely defined when RPR and/or WP are used. As such, video coding processes using both template-based inter prediction techniques and RPR/WP may be more complex to implement and/or provide for sub-optimal coding efficiency.

Examples

In general, the following techniques of this disclosure can be applied to any template-based inter prediction techniques. Without loss of generality, the disclosure shows examples for LIC and TM to specify how RPR and WP can interact with LIC and TM.

Section 1—Enabling Conditions of Template-Based Inter Prediction

The examples listed below describe RPR restrictions on LIC to determine whether LIC can be applied or not based on the respective picture sizes of the current picture and the reference picture(s).

In one example, when the coding mode of an inter-prediction block is AMVP or merge mode (e.g., either regular AMVP/merge or affine AMVP/merge mode), LIC is not applied (e.g., is disabled) to an inter prediction hypothesis for a block when the corresponding reference picture used in generating the inter prediction hypothesis is smaller or larger than the current picture (e.g., the reference picture is a different size than the current picture). When a corresponding reference picture is a different size than a current picture, RPR is typically enabled. As such, in one example of the disclosure, video encoder 200 and video decoder 300 may be configured to not apply LIC when RPR is enabled. Said in another way, video encoder 200 and video decoder 300 may be configured to not apply LIC when a corresponding reference picture used for LIC is a different size (e.g., larger or smaller) than current picture containing the block of video data being coded.

Accordingly, in one example of the disclosure, video encoder 200 and video decoder may be configured to determine that an RPR mode is enabled, determine not to apply a template-based inter prediction technique to the video data based on the RPR mode being enabled, and decode the video data using inter prediction without applying the template-based inter prediction technique.

In one example of bi-prediction, video encoder 200 and video decoder 300 may form two prediction hypotheses based on motion vectors from two different reference picture lists. In some examples, a motion vector from a first reference picture list may point to a reference picture that has a different size than the current picture and another motion vector from a second reference picture list may point to a reference picture that has the same size as the current picture. As described above, video encoder 200 and video decoder 300 may disable LIC for the prediction hypothesis that is based on a reference picture having a different size than the current picture. However, in another example of the disclosure, video encoder 200 and video decoder 300 may apply LIC to the other inter prediction hypothesis when its reference picture corresponding to the other reference picture list is at the same picture size as the current picture. That is, LIC may be performed on a prediction hypothesis for a motion vector associated with one of the reference picture lists if the reference picture pointed to by the motion vector is the same size as the current picture. As such, in one example, LIC may be performed on one prediction hypothesis for bi-prediction, but not the other prediction hypothesis.

In (regular or affine) AMVP modes, when all the reference pictures of a inter prediction block have a different picture size from the current picture, video encoder 200 may be configured to not signal the block-level (or CU-level) LIC flag in the encoded video bitstream. Instead, in this situation, video decoder 300 is configured to infer the value of the LIC flag to be 0 (e.g., LIC is not applied). For example, when the reference picture of a uni-predicted block is smaller or larger than the current picture, the LIC flag is not signaled; when none of the reference pictures of a bi-predicted block is the same size as the current picture, the LIC flag is not signaled. In general, video decoder 300 may be configured to infer a value of an LIC flag based on RPR being used for a reference picture of a current block.

In another example, in the case of bi-prediction, video encoder 200 and video decoder 300 are configured to not apply LIC to an inter block when at least one of the reference pictures used in the bi-prediction has a picture size that is different from the current picture. Again, a CU-level LIC flag is not signaled, and instead the video decoder infers the value of the LIC flag to be 0 (e.g., meaning LIC is not applied).

In another example, a slice-level LIC flag may not be signaled and is inferred to have a value of 0 when none of the reference pictures in either reference picture list is the same picture size as the current picture.

The examples listed below extend the above examples related to the interaction of LIC and RPR mode to WP mode. The examples below are referred to as WP restrictions on LIC.

In one example, when the coding mode of an inter-prediction block is AMVP or merge mode (e.g., either regular AMVP/merge or affine AMVP/merge mode), LIC is not applied to the inter prediction hypothesis when WP is applied to the corresponding reference picture. In addition, in the case of bi-prediction, LIC may be applied to the a inter prediction hypothesis when WP is not applied to the reference picture corresponding to the reference picture list corresponding to the inter prediction hypothesis.

In (regular or affine) AMVP modes, when WP is applied to all the reference pictures of a inter prediction block, the block-level (or CU-level) LIC flag is not signaled in bitstream and is inferred as 0 at video decoder 300. For example, when WP is applied to the reference picture of a uni-predicted block, the LIC flag is not signaled; when WP is applied to both reference pictures of a bi-predicted block, the LIC flag is not signaled.

In another example, in the case of bi-prediction, video encoder 200 and video decoder 300 do not apply LIC for an inter block when WP is applied to at least one of the reference pictures. The corresponding CU-level LIC flag is not signaled and is inferred as 0.

In another example, a slice-level LIC flag may not be signaled and is inferred as 0 when WP is applied to all the reference pictures of both reference picture lists.

The examples listed below describe RPR restrictions on template matching (TM) prediction to determine whether TM can be applied or not based on the respective picture sizes of the current picture and the reference picture(s).

In one example, when the coding mode of an inter-prediction block is AMVP mode (e.g., either regular AMVP or affine AMVP mode), video encoder 200 and video decoder 300 can bypass TM (e.g., disable or not apply TM) and none of the MV predictors for the current block are refined using TM when the corresponding reference picture is smaller or larger than the current picture (e.g., when RPR is enabled). TM being bypassed means that the AMVP candidate index cannot be determined by TM and MVs and MV predictors of the current block are no longer refined. When TM is bypassed, an AMVP index may be signaled in the bitstream by video encoder 200 and parsed by video decoder 300 to indicate which of the MV predictor in AMVP candidate list is used.

In a further example, in the case of bi-prediction, it is possible that TM is applied only to a MV predictor corresponding to one reference picture and bypassed for the other MV predictor depending on the reference picture size relative to the current picture size. For example, when the reference picture of a uni-predicted block is smaller or larger than the current picture, TM is bypassed and the AMVP index is signaled. When none of the reference pictures of a bi-predicted block has the same picture size as the current picture, TM is bypassed for the MV predictors of both reference pictures and respective AMVP indices are signaled. When only one of the reference pictures of a bi-prediction block is the same picture size as the current picture (while the other reference picture is not), only the MV predictor associated with the reference picture that is the same size as the current picture is refined by TM (and thus its AMVP index is determined by TM and AMVP index need not be signaled), while TM is bypassed for the other MV predictor associated with the reference picture that is not the same size as the current picture, and its AMVP index is signaled.

In another example, in the case of bi-prediction, video encoder 200 and video decoder 300 are configured to not apply TM to an inter block (both regular and affine AMVP modes) when at least one of the reference pictures has a picture size that is different from the current picture.

In another example, when TM is bypassed due to the reference picture size being different then the size of the current picture, video decoder 300 may be configured to infer the value of the AMVP index to be 0. Video encoder 200 would not signal the AMVP index in this situation.

In another example, when the coding mode of an inter-prediction block is merge mode (e.g., either regular merge or affine merge mode), video encoder 200 and video decoder 300 may be configured to bypass TM and none of the motion vectors of the current block are refined when the corresponding reference picture is smaller or larger than the current picture. In addition, in the case of bi-prediction, it is possible that TM is applied only to a MV corresponding to one reference picture and bypassed for the other MV, all depending on the reference picture size relative to the current picture size. For example, when the reference picture of a uni-predicted block is smaller or larger than the current picture, TM is bypassed. When none of the reference pictures of a bi-predicted block is at the same picture size as the current picture, TM is bypassed for the motion vectors of both reference pictures. When only one of the reference pictures of a bi-prediction block is at the same picture size as the current picture (while the other reference picture is not), only the motion vector associated with the reference picture is refined by TM, while TM is bypassed for the other motion vector.

In another example, in the case of bi-prediction, video encoder 200 and video decoder 300 do not apply TM for an inter block for both regular and affine merge modes when at least one of the reference pictures is at a picture size that is different from the current picture.

In another example, a motion vector of a geometric (GEO) partition may not be refined by TM when its corresponding reference picture size is different from the current picture size.

In another example, merge mode with motion vector difference (MMVD) candidates are not sorted based on TM cost when a reference picture size is different from the current picture. Instead, a default order (e.g., from smaller MVD to large MVD) is assigned for all MMVD candidates.

In another example, video encoder and video decoder 300 may be configured to disable TM completely at the slice level when none of the reference pictures in both reference picture lists is at the same picture size as the current picture. Accordingly, a CU-level TM flag for merge modes is not signaled and is inferred to be 0 (e.g., TM mode not applied).

The examples listed below extend the above examples to TM. The extensions are referred hereafter to as WP restrictions on TM.

In one example, when the coding mode of an inter-prediction block is AMVP mode (e.g., either regular AMVP or affine AMVP mode), TM can be bypassed and none of the current-block MV predictors is refined when WP is applied to the corresponding reference picture. In particular when TM is bypassed (which implies that the AMVP candidate index cannot be determined by TM and MVs and MV predictors of the current block are no longer refined), the AMVP index is signaled in the bitstream at video encoder 200 and parsed by video decoder 300 to indicate which MV predictor in AMVP candidate list is used.

In another example of bi-prediction, it is possible that TM is applied only to a MV predictor corresponding to one reference picture and bypassed for the other MV predictor, depending on whether WP is applied to the reference picture. For example, when WP is applied to the reference picture of a uni-predicted block, TM is bypassed and the AMVP index is signaled. When none of the reference pictures of a bi-predicted block have WP applied, TM is bypassed for the MV predictors of both reference pictures and the respective AMVP indices are signaled. When only one of the reference pictures of a bi-prediction block has WP applied (while the other reference picture does not have WP applied), only the MV predictor associated to the reference picture where WP is not applied is refined by TM (and thus its AMVP index is determined by TM and AMVP index need not be signaled), while TM is bypassed for the other MV predictor where WP is applied to the reference picture and its AMVP index is signaled.

In another example, in the case of bi-prediction, video encoder 200 and video decoder 300 do not apply TM to an inter block (both regular and affine) AMVP modes when WP is applied to at least one of the reference pictures.

In another example, when TM is bypassed due to WP being applied to the reference picture, the AMVP index can be inferred as 0 at video decoder 300 and need not be signaled by video encoder 200.

When the coding mode of an inter-prediction block is merge mode (e.g., either regular merge or affine merge mode), TM can be bypassed and none of the motion vectors of the current block are refined when WP is applied to the corresponding reference picture. In addition, in the case of bi-prediction, it is possible that TM is applied only to a motion vector corresponding to one reference picture and bypassed for the other motion vector, depending on whether WP is applied to the reference pictures. For example, when the reference picture of a uni-predicted block has WP applied, TM is bypassed. When none of the reference pictures of a bi-predicted block has WP applied, TM is bypassed for the motion vectors of both reference pictures. When only one of the reference pictures of a bi-prediction block does not has WP applied (while WP is applied to the other reference picture), only the motion vector associated to the reference picture is refined by TM, while TM is bypassed for the other MV.

In another example, a MV of GEO partitions may not be refined by TM when its corresponding reference picture has WP applied.

In another example, the MMVD candidates are not sorted based on TM cost when a reference picture has WP applied. Instead, a default order (e.g., from smaller MVD to large MVD) is used for all MMVD candidates.

In another example, TM can be disabled completely at the slice level when all reference pictures in both reference picture lists have WP applied. Accordingly, a CU-level TM flag for merge modes need not be signaled and is inferred to have a value of 0 (e.g., TM is bypassed and not applied).

Section 2—Candidate List Construction of Merge Modes

Restrictions, as disclosed in Section 1, can be avoided for merge modes with template-based inter prediction if the merge candidate list of a merge mode (e.g., regular merge mode, affine merge mode, TM merge mode, GEO merge mode, MMVD mode) does not contain any candidate that has scaled reference picture size(s) (e.g., scaled by RPR) and/or weight-predicted reference picture(s). In the other words, a merge candidate may be pruned out before being inserted into merge candidate list, if such candidate would trigger restrictions as disclosed in Section 1.

In one example, video encoder 200 and video decoder 300 may be configured to apply a pruning process to a merge candidate list (e.g., either regular merge, TM merge, or affine merge) based on a size of a reference picture associated with a particular merge candidate. For example, video encoder 200 and video decoder 300 may be configured to prune (e.g., remove) a motion vector candidate from the merge candidate list that is associated with at least one reference picture that has a different size than the current picture.

In this example, video encoder 200 and video decoder 300 may be configured to construct a merge candidate list for a block of the video data. The merge candidate list may be for any inter prediction mode, including regular merge mode, TM merge mode, and affine merge mode. Video encoder 200 and video decoder 300 may prune the merge candidate list to create a pruned merge candidate list. In this context, pruning the merge candidate list includes removing merge candidates that have at least one reference picture that is a different size than a current picture of the video data. Video encoder 200 and video decoder 300 may then code the block of the video data using the pruned merge candidate list.

In another example, video encoder 200 and video decoder 300 may be configured to apply a pruning method to the merge candidate list (e.g., either regular merge, TM merge or affine merge) to prune out a motion vector candidate with all reference pictures that are at a picture size different from the current picture.

In another example, when a merge candidate is bi-predicted with only one reference picture that is at a picture size different from the current picture (and the other reference picture at the same size as the current picture), video encoder 200 and video decoder 300 may be configured to degenerate the bi-predicted candidate to be a uni-predicted candidate by removing the motion vector that is associated with the unequal sized reference picture relative to the current picture.

In another example, video encoder 200 and video decoder 300 may be configured to apply a pruning method to the merge candidate list (e.g., either regular merge, TM merge or affine merge) to prune out a motion vector candidate with at least one reference picture to which WP is applied.

In another example, video encoder 200 and video decoder 300 may be configured to apply a pruning method to the merge candidate list (e.g., either regular merge, TM merge or affine merge) to prune out a motion vector candidate with all reference pictures to which WP has been applied.

In another example, when a merge candidate is bi-predicted with only one reference picture to which WP has been applied (and the other reference picture does not have WP applied), video encoder 200 and video decoder 300 may be configured to degenerate the bi-predicted candidate to be a uni-predicted candidate by removing the motion vector that is associated with the reference picture to which WP was applied.

In another example, if all the candidates in the merge candidate list are pruned, then the merge candidate construction process starts over again and the aforementioned pruning process is not applied. When any one of such merge candidates is used, then the respective restrictions as disclosed in Section 1 are applied.

In another example, the resulting candidate list generated with the above changes applied to regular merge list construction process can be directly used for other merge modes, such as GEO and MMVD, to generate GEO candidate motion and MMVD candidate motion.

Alternatively, some example video techniques may keep the merge candidate list construction process of merge modes (e.g., regular merge) unchanged. However, video encoder 200 may be configured to not choose candidates from the merge candidate list associated with references pictures of different size than the current picture and/or with reference pictures to which WP has been applied.

In an example, when performing the GEO candidate list construction process, video encoder 200 and video decoder 300 may skip sampling the motion vector candidates that are pointing to reference pictures with a larger or smaller size than the current picture. For example, when the candidate is coded with uni-predicted motion pointing to a scaled reference picture size, then this candidate is skipped. In another example, when the candidate is coded with bi-predicted motion, there are three different cases to be considered. (1) If both motion vectors of the candidate are pointing to scaled reference pictures, then this candidate is skipped. (2) If only one motion vector of the candidate is pointing to a scaled reference picture, then the other motion vector of the candidate is inserted into GEO candidate list. (3) If both motion vectors of the candidate are associated with unscaled reference pictures, then the same parity-based selection as in the VVC Test Model (VTM) is applied.

In another example, for the MMVD base candidate list (e.g., the first 1 or 2 candidates of regular merge candidate list), video encoder 200 and video decoder 300 may skip sampling the motion vector candidates that are pointing to reference pictures with a larger or smaller size than the current picture. For example, when the candidate is coded with uni-predicted motion pointing to a scaled reference picture size, then this candidate is skipped. In another example, when the candidate is coded with bi-predicted motion, there are three different cases to be considered. (1) If both motion vectors of the candidate are associated with scaled reference pictures, then this candidate is skipped. (2) If only one motion vector of the candidate is associated with a scaled reference picture, then this candidate is degenerated to a uni-predicted candidate by removing the motion vector associated with scaled reference picture. (3) If both motion vectors of the candidate are associated with unscaled reference pictures, then this candidate can be directly used for MMVD without change. In another example, the MMVD process may include checking more candidates beyond the first 1 and 2 candidates of the regular merge candidate list, when at least one of the first 2 candidates in the regular merge candidate list is fully pruned.

In another example, for the GEO candidate list construction process, video encoder 200 and video decoder 300 may skip sampling the motion vector candidates that are pointing to reference pictures to which WP has been applied. For example, when the candidate is coded with uni-predicted motion pointing to a reference picture with WP applied, then this candidate is skipped. In another example, when the candidate is coded with bi-predicted motion, there are three different cases to be considered. (1) If both motion vectors of the candidate are pointing to reference pictures with WP applied, then this candidate is skipped. (2) If only one motion vector of the candidate is pointing to a reference picture with WP applied, then the other motion vector of the candidate is inserted into GEO candidate list. (3) If None of motion vectors of the candidate is pointing to reference pictures with WP applied, then the same parity-based selection as VTM is applied.

In another example, for an MMVD base candidate list (e.g., the first 1 or 2 candidates of regular merge candidate list), video encoder 200 and video decoder 300 may may skip sampling the motion vector candidates that are pointing to reference pictures with WP applied. For example, when the candidate is coded with uni-predicted motion pointing to a reference picture with WP applied, then this candidate is skipped. In another example, when the candidate is coded with bi-predicted motion, there are three different cases to be considered. (1) If both motion vectors of the candidate are pointing to reference pictures with WP applied, then this candidate is skipped. (2) If only one motion vector of the candidate is pointing to a reference picture with WP applied, then this candidate is degenerated to a uni-predicted candidate by removing the motion vector to which WP is applied. (3) If both motion vectors of the candidate are pointing to reference pictures without WP applied, then this candidate can be directly used for MMVD without change. In another example, the MMVD process may include checking more candidates beyond the first 1 and 2 candidate of regular merge candidate list, when at least one of the first 2 candidates in the regular merge candidate list is fully pruned.

Section 2 Exception Handling of Template-Based Inter Prediction

Different from Section 1, video encoder 200 and video decoder 300 are configured to neither disable nor bypass template-based inter prediction techniques no matter whether the aforementioned restrictions are triggered or not. In the other words, video encoder 200 and video decoder 300 are configured to perform template-based inter prediction techniques and code syntax elements and/or sort candidates whenever necessary.

In an example, when the current picture size is different from the reference picture size, video encoder 200 and video decoder 300 still perform motion compensation on the reference template block using the respective interpolation filter of RPR. Accordingly, the reference template block size matches the current template block and thus the template-based inter prediction techniques still can be performed.

In another example, when WP is applied to the reference picture of an inter block, video encoder 200 and video decoder 300 may still perform motion compensation on the reference template block with WP parameters, and then the template-based inter prediction techniques still can be performed.

Alternatively in another example, video encoder 200 and video decoder 300 do not use WP parameters when the reference template block is motion compensated.

Figure 7:
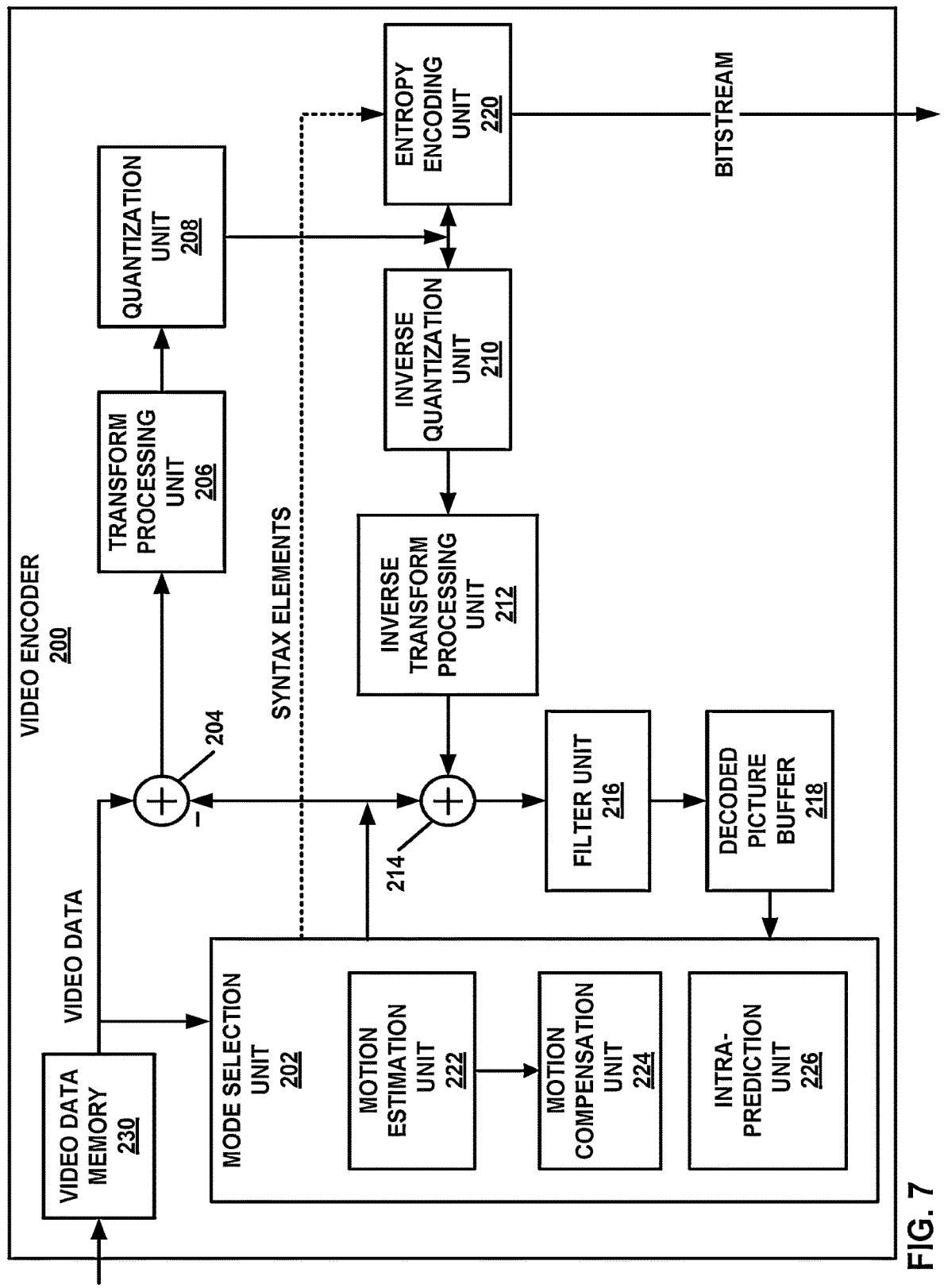
FIG. 7 is a block diagram illustrating an example video encoder that may perform the techniques of this disclosure.

FIG. 7 is a block diagram illustrating an example video encoder 200 that may perform the techniques of this disclosure. FIG. 7 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards and video coding formats, such as AV1 and successors to the AV1 video coding format.

In the example of FIG. 7, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 7 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

Motion estimation unit 222 and motion compensation unit 224 may be configured to perform one or more template-based inter prediction techniques, such as LIC and TM inter prediction, as described above. Motion estimation unit 222 and motion compensation unit 224 may be configured to perform any of the techniques above that define who template-based inter prediction techniques are used together with RPR and/or WP.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to perform the reference picture resampling and template based inter prediction techniques of this disclosure. For example, video encoder 200 may be configured to determine that an RPR mode is enabled, determine not to apply a template-based inter prediction technique to the video data based on the RPR mode being enabled, and encode the video data using inter prediction without applying the template-based inter prediction technique.

Figure 8:
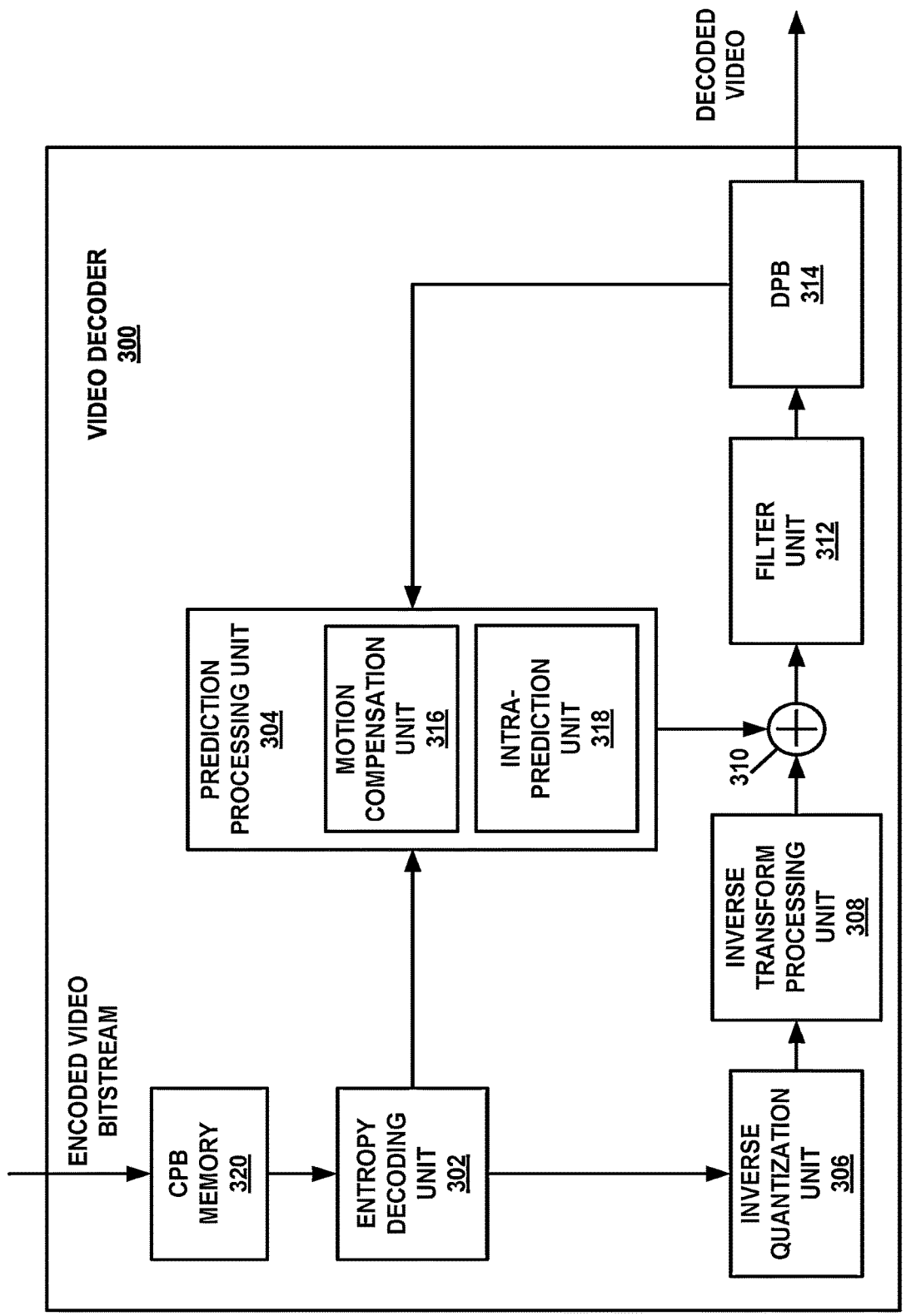
FIG. 8 is a block diagram illustrating an example video decoder that may perform the techniques of this disclosure.

FIG. 8 is a block diagram illustrating an example video decoder 300 that may perform the techniques of this disclosure. FIG. 8 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 8, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

Motion compensation unit 316 may be configured to perform one or more template-based inter prediction techniques, such as LIC and TM inter prediction, as described above. Motion compensation unit 316 may be configured to perform any of the techniques above that define who template-based inter prediction techniques are used together with RPR and/or WP.

When operating according to AV1, compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 8 are illustrated to assist with understanding the operations performed by video decoder 300. The units may be implemented as fixed-function circuits, programmable circuits, or a combination thereof. Similar to FIG. 7, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 7).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 7). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to perform the reference picture resampling and template based inter prediction techniques of this disclosure. For example, video decoder 300 may be configured to determine that an RPR mode is enabled, determine not to apply a template-based inter prediction technique to the video data based on the RPR mode being enabled, and decode the video data using inter prediction without applying the template-based inter prediction technique.

Figure 9:
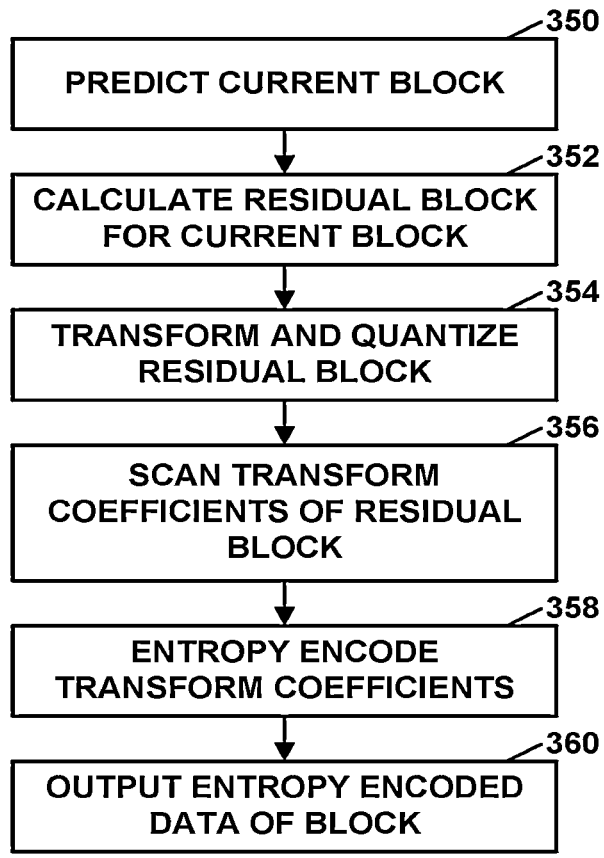
FIG. 9 is a flowchart illustrating an example method for encoding a current block in accordance with the techniques of this disclosure.

FIG. 9 is a flowchart illustrating an example method for encoding a current block in accordance with the techniques of this disclosure. The current block may comprise a current CU. Although described with respect to video encoder 200 (FIGS. 1 and 7), it should be understood that other devices may be configured to perform a method similar to that of FIG. 9.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 10:
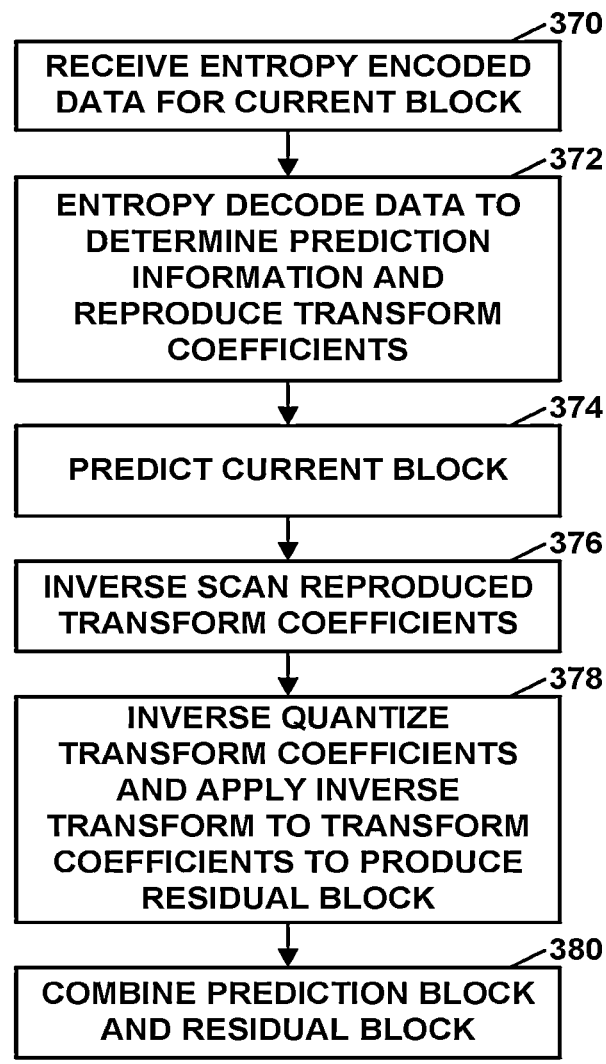
FIG. 10 is a flowchart illustrating an example method for decoding a current block in accordance with the techniques of this disclosure.

FIG. 10 is a flowchart illustrating an example method for decoding a current block of video data in accordance with the techniques of this disclosure. The current block may comprise a current CU. Although described with respect to video decoder 300 (FIGS. 1 and 8), it should be understood that other devices may be configured to perform a method similar to that of FIG. 10.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 11:
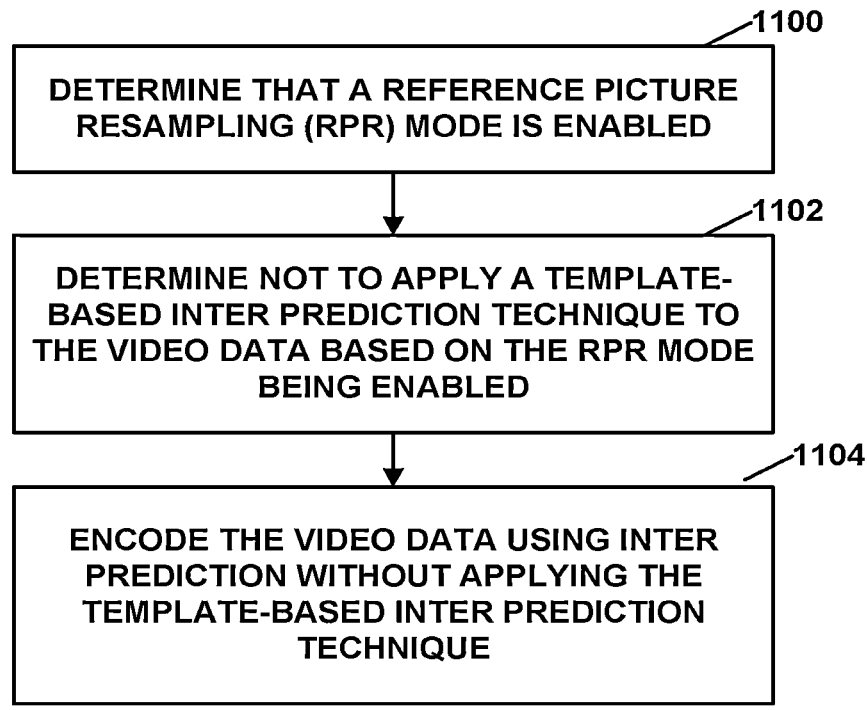
FIG. 11 is a flowchart illustrating another example method for video data in accordance with the techniques of this disclosure.

FIG. 11 is a flowchart illustrating another example method for video data in accordance with the techniques of this disclosure. The techniques of FIG. 11 may be performed by one or more structural components of video encoder 200, including motion estimation unit 222 and/or motion compensation unit 224.

In one example of the disclosure, video encoder 200 may be configured to determine that a reference picture resampling (RPR) mode is enabled (1100). In one example, video encoder 200 may be configured to determine that the RPR mode is enabled based on a reference picture for the video data being a different size than a current picture of the video data. In another example, video encoder 200 is configured to code the video data using bi-prediction. In this example, the RPR mode is enabled based on at least one reference picture of multiple reference pictures being a different size than a current picture of the video data.

Video encoder 200 may further be configured to determine not to apply a template-based inter prediction technique to the video data based on the RPR mode being enabled (1102). In one example, the template-based inter prediction technique is local illumination compensation (LIC). In another example, the template-based inter prediction technique is template matching (TM) prediction. The inter prediction may be one of regular merge mode, regular advanced motion vector prediction (AMVP) mode, affine merge mode, or affine AMVP mode.

Video encoder 200 may further be configured to encode the video data using inter prediction without applying the template-based inter prediction technique (1104). For example, video encoder 200 may not apply LIC to an inter prediction hypothesis of the video data.

Figure 12:
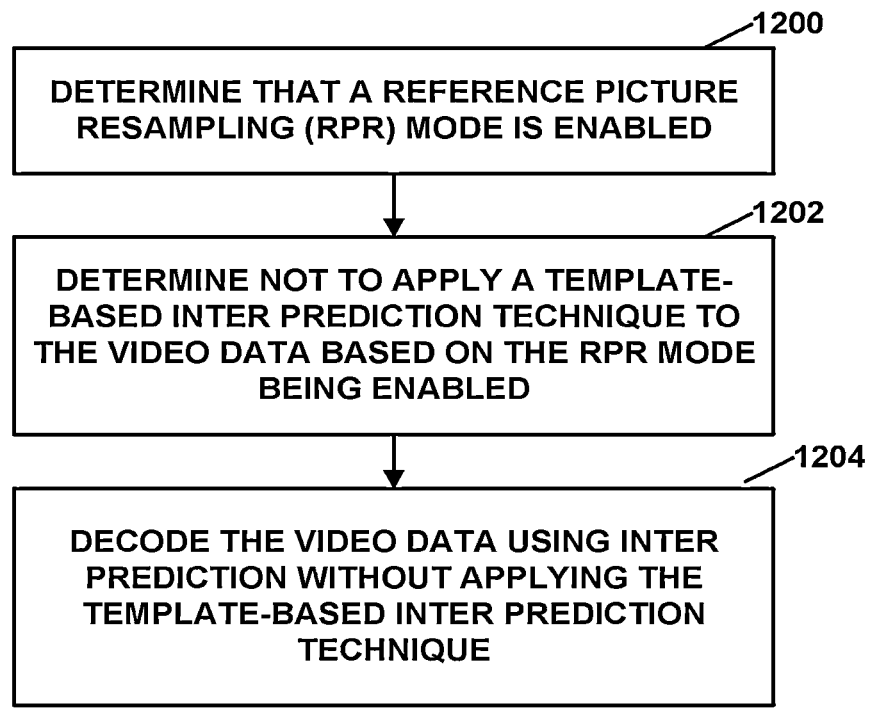
FIG. 12 is a flowchart illustrating another example method for decoding video data in accordance with the techniques of this disclosure.

FIG. 12 is a flowchart illustrating another example method for decoding video data in accordance with the techniques of this disclosure. The techniques of FIG. 12 may be performed by one or more structural components of video decoder 300, including motion compensation unit 316.

In one example of the disclosure, video decoder 300 may be configured to determine that a reference picture resampling (RPR) mode is enabled (1200). In one example, video decoder 300 may be configured to determine that the RPR mode is enabled based on a reference picture for the video data being a different size than a current picture of the video data. In another example, video decoder 300 is configured to code the video data using bi-prediction. In this example, the RPR mode is enabled based on at least one reference picture of multiple reference pictures being a different size than a current picture of the video data.

Video decoder 300 may further be configured to determine not to apply a template-based inter prediction technique to the video data based on the RPR mode being enabled (1202). In one example, the template-based inter prediction technique is local illumination compensation (LIC). In another example, the template-based inter prediction technique is template matching (TM) prediction. The inter prediction may be one of regular merge mode, regular advanced motion vector prediction (AMVP) mode, affine merge mode, or affine AMVP mode.

Video decoder 300 may further be configured to decode the video data using inter prediction without applying the template-based inter prediction technique (1204). For example, video decoder 300 may not apply LIC to an inter prediction hypothesis of the video data.

In another example, video decoder 300 may be configured to infer a value of a local illumination compensation (LIC) flag based on RPR being used for a reference picture of a current block.

In another example, when the inter prediction is a merge mode, video decoder 300 may be configured to construct a merge candidate list for a block of the video data, prune the merge candidate list to create a pruned merge candidate list, wherein pruning the merge candidate list includes removing merge candidates that have at least one reference picture that is a different size than a current picture of the video data, and decode the block of the video data using the pruned merge candidate list.

In another example, when the inter prediction is a merge mode, video decoder 300 may be configured to construct a merge candidate list for a block of the video data, prune the merge candidate list to create a pruned merge candidate list, wherein pruning the merge candidate list includes removing merge candidates that have all reference pictures that are a different size than a current picture of the video data, and decode the block of the video data using the pruned merge candidate list.

Other illustrative aspects of the disclosure are described below.

Aspect 1A—A method of coding video data, the method comprising: determining whether or not to apply a local illumination compensation (LIC) mode to the video data based on whether or not reference picture resampling (RPR) mode is enabled; and coding the video data using the LIC mode and/or the RPR mode based on the determining.

Aspect 2A—A method of coding video data, the method comprising: determining whether or not to apply a local illumination compensation (LIC) mode to the video data based on whether or not weighted prediction (WP) mode is enabled; and coding the video data using the LIC mode and/or the WP mode based on the determining.

Aspect 3A—A method of coding video data, the method comprising: determining whether or not to apply a template matching (TM) mode to the video data based on whether or not reference picture resampling (RPR) mode is enabled; and coding the video data using the TM mode and/or the RPR mode based on the determining.

Aspect 4A—A method of coding video data, the method comprising: determining whether or not to apply a template matching (TM) mode to the video data based on whether or not weighted prediction (WP) mode is enabled; and coding the video data using the TM mode and/or the WP mode based on the determining.

Aspect 5A—A method of any combination of Aspects 1A-4A.

Aspect 6A—The method of any of claims 1A-5A, wherein coding comprises decoding.

Aspect 7A—The method of any of Aspects 1A-5A, wherein coding comprises encoding.

Aspect 8A—A device for coding video data, the device comprising one or more means for performing the method of any of Aspects 1A-7A.

Aspect 9A—The device of Aspects 8A, wherein the one or more means comprise one or more processors implemented in circuitry.

Aspect 10A—The device of any of Aspects 8A and 9A, further comprising a memory to store the video data.

Aspect 11A—The device of any of Aspects 8A-10A, further comprising a display configured to display decoded video data.

Aspect 12A—The device of any of Aspects 8A-11A, wherein the device comprises one or more of a camera, a computer, a mobile device, a broadcast receiver device, or a set-top box.

Aspect 13A—The device of any of Aspects 8A-12A, wherein the device comprises a video decoder.

Aspect 14A—The device of any of Aspects 8A-13A, wherein the device comprises a video encoder.

Aspect 15A—A computer-readable storage medium having stored thereon instructions that, when executed, cause one or more processors to perform the method of any of Aspects 1A-7A.

Aspect 1B—A method of decoding video data, the method comprising: determining that a reference picture resampling (RPR) mode is enabled; determining not to apply a template-based inter prediction technique to the video data based on the RPR mode being enabled; and decoding the video data using inter prediction without applying the template-based inter prediction technique.

Aspect 2B—The method of Aspect 1B, wherein the template-based inter prediction technique is local illumination compensation (LIC).

Aspect 3B—The method of Aspect 2B, wherein decoding the video data without applying the template-based inter prediction technique comprises: not applying LIC to an inter prediction hypothesis of the video data.

Aspect 4B—The method of Aspect 1B, wherein RPR mode is enabled based on a reference picture for the video data being a different size than a current picture of the video data.

Aspect 5B—The method of Aspect 1B, wherein the inter prediction is one of regular merge mode, regular advanced motion vector prediction (AMVP) mode, affine merge mode, or affine AMVP mode.

Aspect 6B—The method of Aspect 5B, further comprising: inferring a value of a local illumination compensation (LIC) flag based on RPR being used for a reference picture of a current block.

Aspect 7B—The method of Aspect 5B, wherein the inter prediction is a merge mode, the method further comprising: constructing a merge candidate list for a block of the video data; pruning the merge candidate list to create a pruned merge candidate list, wherein pruning the merge candidate list includes removing merge candidates that have at least one reference picture that is a different size than a current picture of the video data; and decoding the block of the video data using the pruned merge candidate list.

Aspect 8B—The method of Aspect 5B, wherein the inter prediction is a merge mode, the method further comprising: constructing a merge candidate list for a block of the video data; pruning the merge candidate list to create a pruned merge candidate list, wherein pruning the merge candidate list includes removing merge candidates that have all reference pictures that are a different size than a current picture of the video data; and decoding the block of the video data using the pruned merge candidate list.

Aspect 9B—The method of Aspect 1B, wherein the inter-prediction is bi-prediction, and wherein the RPR mode is enabled based on at least one reference picture of multiple reference pictures being a different size than a current picture of the video data.

Aspect 10B—The method of Aspect 1B, wherein the template-based inter prediction technique is template matching (TM) prediction.

Aspect 11B—The method of Aspect 1B, further comprising: displaying a picture of the video data.

Aspect 12B—An apparatus configured to decode video data, the apparatus comprising: a memory configured to store the video data; and one or more processors implemented in circuitry and in communication with the memory, the one or more processors configured to: determine that a reference picture resampling (RPR) mode is enabled; determine not to apply a template-based inter prediction technique to the video data based on the RPR mode being enabled; and decode the video data using inter prediction without applying the template-based inter prediction technique.

Aspect 13B—The apparatus of Aspect 12B, wherein the template-based inter prediction technique is local illumination compensation (LIC).

Aspect 14B—The apparatus of Aspect 13B, wherein to decode the video data without applying the template-based inter prediction technique, the one or more processors are further configured to: not apply LIC to an inter prediction hypothesis of the video data.

Aspect 15B—The apparatus of Aspect 12B, wherein RPR mode is enabled based on a reference picture for the video data being a different size than a current picture of the video data.

Aspect 16B—The apparatus of Aspect 12B, wherein the inter prediction is one of regular merge mode, regular advanced motion vector prediction (AMVP) mode, affine merge mode, or affine AMVP mode.

Aspect 17B—The apparatus of Aspect 16B, wherein the one or more processors are further configured to: infer a value of a local illumination compensation (LIC) flag based on RPR being used for a reference picture of a current block.

Aspect 18B—The apparatus of Aspect 16B, wherein the inter prediction is a merge mode, and wherein the one or more processors are further configured to: construct a merge candidate list for a block of the video data; prune the merge candidate list to create a pruned merge candidate list, wherein pruning the merge candidate list includes removing merge candidates that have at least one reference picture that is a different size than a current picture of the video data; and decode the block of the video data using the pruned merge candidate list.

Aspect 19B—The apparatus of Aspect 16B, wherein the inter prediction is a merge mode, and wherein the one or more processors are further configured to: construct a merge candidate list for a block of the video data; prune the merge candidate list to create a pruned merge candidate list, wherein pruning the merge candidate list includes removing merge candidates that have all reference pictures that are a different size than a current picture of the video data; and decode the block of the video data using the pruned merge candidate list.

Aspect 20B—The apparatus of Aspect 12B, wherein the inter-prediction is bi-prediction, and wherein the RPR mode is enabled based on at least one reference picture of multiple reference pictures being a different size than a current picture of the video data.

Aspect 21B—The apparatus of Aspect 12B, wherein the template-based inter prediction technique is template matching (TM) prediction.

Aspect 22B—The apparatus of Aspect 12B, further comprising: a display configured to display a picture of the video data.

Aspect 23B—A method of encoding video data, the method comprising: determining that a reference picture resampling (RPR) mode is enabled; determining not to apply a template-based inter prediction technique to the video data based on the RPR mode being enabled; and encoding the video data using inter prediction without applying the template-based inter prediction technique.

Aspect 24B—An apparatus configured to encode video data, the apparatus comprising: a memory configured to store the video data; and one or more processors implemented in circuitry and in communication with the memory, the one or more processors configured to: determine that a reference picture resampling (RPR) mode is enabled; determine not to apply a template-based inter prediction technique to the video data based on the RPR mode being enabled; and encode the video data using inter prediction without applying the template-based inter prediction technique.

Aspect 25B—A method of decoding video data, the method comprising: determining that a reference picture resampling (RPR) mode is enabled; and applying a template-based inter prediction technique to the video data based on the RPR mode being enabled.

Aspect 26B—The method of Aspect 25B, wherein applying the template-based inter prediction technique to the video data based on the RPR mode being enabled comprises: applying an interpolation filter to a reference template block of the template-based inter prediction technique, wherein the interpolation filter is the same as used for the RPR mode.

Aspect 27B—The method of Aspect 25B, wherein the template-based inter prediction technique is template matching (TM) prediction.

Aspect 28B—An apparatus configured to decode video data, the apparatus comprising: a memory configured to store the video data; and one or more processors implemented in circuitry and in communication with the memory, the one or more processors configured to: determine that a reference picture resampling (RPR) mode is enabled; and apply a template-based inter prediction technique to the video data based on the RPR mode being enabled.

Aspect 29B—The apparatus of Aspect 28B, wherein to apply the template-based inter prediction technique to the video data based on the RPR mode being enabled, the one or more processors are further configured to: apply an interpolation filter to a reference template block of the template-based inter prediction technique, wherein the interpolation filter is the same as used for the RPR mode.

Aspect 30B—The apparatus of Aspect 28B, wherein the template-based inter prediction technique is template matching (TM) prediction.

Aspect 1C—A method of decoding video data, the method comprising: determining that a reference picture resampling (RPR) mode is enabled; determining not to apply a template-based inter prediction technique to the video data based on the RPR mode being enabled; and decoding the video data using inter prediction without applying the template-based inter prediction technique.

Aspect 2C—The method of Aspect 1C, wherein the template-based inter prediction technique is local illumination compensation (LIC).

Aspect 3C—The method of Aspect 2C, wherein decoding the video data without applying the template-based inter prediction technique comprises: not applying LIC to an inter prediction hypothesis of the video data.

Aspect 4C—The method of any of Aspects 1C-3C, wherein RPR mode is enabled based on a reference picture for the video data being a different size than a current picture of the video data.

Aspect 5C—The method of any of Aspects 1C-4C, wherein the inter prediction is one of regular merge mode, regular advanced motion vector prediction (AMVP) mode, affine merge mode, or affine AMVP mode.

Aspect 6C—The method of Aspect 5C, further comprising: inferring a value of a local illumination compensation (LIC) flag based on RPR being used for a reference picture of a current block.

Aspect 7C—The method of Aspect 5C, wherein the inter prediction is a merge mode, the method further comprising: constructing a merge candidate list for a block of the video data; pruning the merge candidate list to create a pruned merge candidate list, wherein pruning the merge candidate list includes removing merge candidates that have at least one reference picture that is a different size than a current picture of the video data; and decoding the block of the video data using the pruned merge candidate list.

Aspect 8C—The method of Aspect 5C, wherein the inter prediction is a merge mode, the method further comprising: constructing a merge candidate list for a block of the video data; pruning the merge candidate list to create a pruned merge candidate list, wherein pruning the merge candidate list includes removing merge candidates that have all reference pictures that are a different size than a current picture of the video data; and decoding the block of the video data using the pruned merge candidate list.

Aspect 9C—The method of any of Aspects 1C-8C, wherein the inter-prediction is bi-prediction, and wherein the RPR mode is enabled based on at least one reference picture of multiple reference pictures being a different size than a current picture of the video data.

Aspect 10C—The method of any of Aspects 1C-9C, wherein the template-based inter prediction technique is template matching (TM) prediction.

Aspect 11C—The method of any of Aspects 1C-10C, further comprising: displaying a picture of the video data.

Aspect 12C—An apparatus configured to decode video data, the apparatus comprising: a memory configured to store the video data; and one or more processors implemented in circuitry and in communication with the memory, the one or more processors configured to: determine that a reference picture resampling (RPR) mode is enabled; determine not to apply a template-based inter prediction technique to the video data based on the RPR mode being enabled; and decode the video data using inter prediction without applying the template-based inter prediction technique.

Aspect 13C—The apparatus of Aspect 12C, wherein the template-based inter prediction technique is local illumination compensation (LIC).

Aspect 14C—The apparatus of Aspect 13C, wherein to decode the video data without applying the template-based inter prediction technique, the one or more processors are further configured to: not apply LIC to an inter prediction hypothesis of the video data.

Aspect 15C—The apparatus of any of Aspects 12C-14C, wherein RPR mode is enabled based on a reference picture for the video data being a different size than a current picture of the video data.

Aspect 16C—The apparatus of any of Aspects 12C-15C, wherein the inter prediction is one of regular merge mode, regular advanced motion vector prediction (AMVP) mode, affine merge mode, or affine AMVP mode.

Aspect 17C—The apparatus of Aspect 16C, wherein the one or more processors are further configured to: infer a value of a local illumination compensation (LIC) flag based on RPR being used for a reference picture of a current block.

Aspect 18C—The apparatus of Aspect 16C, wherein the inter prediction is a merge mode, and wherein the one or more processors are further configured to: construct a merge candidate list for a block of the video data; prune the merge candidate list to create a pruned merge candidate list, wherein pruning the merge candidate list includes removing merge candidates that have at least one reference picture that is a different size than a current picture of the video data; and decode the block of the video data using the pruned merge candidate list.

Aspect 19C—The apparatus of Aspect 16C, wherein the inter prediction is a merge mode, and wherein the one or more processors are further configured to: construct a merge candidate list for a block of the video data; prune the merge candidate list to create a pruned merge candidate list, wherein pruning the merge candidate list includes removing merge candidates that have all reference pictures that are a different size than a current picture of the video data; and decode the block of the video data using the pruned merge candidate list.

Aspect 20C—The apparatus of any of Aspects 12C-19C, wherein the inter-prediction is bi-prediction, and wherein the RPR mode is enabled based on at least one reference picture of multiple reference pictures being a different size than a current picture of the video data.

Aspect 21C—The apparatus of any of Aspects 12C-20C, wherein the template-based inter prediction technique is template matching (TM) prediction.

Aspect 22C—The apparatus of any of Aspects 12C-21C, further comprising: a display configured to display a picture of the video data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining that a reference picture resampling (RPR) mode is enabled;
   determining not to apply a template-based inter prediction technique to the video data based on the RPR mode being enabled; and
   decoding the video data using inter prediction without applying the template-based inter prediction technique, wherein the inter prediction is a merge mode, the method further comprising:
      constructing a merge candidate list for a block of the video data comprising pruning the merge candidate list, wherein pruning the merge candidate list includes excluding merge candidates from the merge candidate list that have at least one reference picture that is a different size than a current picture of the video data; and
      decoding the block of the video data using the merge candidate list.

2. The method of claim 1, wherein the template-based inter prediction technique is local illumination compensation (LIC).

3. The method of claim 2, wherein decoding the video data without applying the template-based inter prediction technique comprises:
   not applying LIC to an inter prediction hypothesis of the video data.

4. The method of claim 1, wherein RPR mode is enabled based on a reference picture for the video data being a different size than a current picture of the video data.

5. The method of claim 1, wherein the merge mode is one of regular merge mode or affine merge mode.

6. The method of claim 5, further comprising:
   inferring a value of a local illumination compensation (LIC) flag based on RPR being used for a reference picture of a current block.

7. The method of claim 1, wherein the inter-prediction is bi-prediction, and wherein the RPR mode is enabled based on at least one reference picture of multiple reference pictures being a different size than a current picture of the video data.

8. The method of claim 1, wherein the template-based inter prediction technique is template matching (TM) prediction.

9. The method of claim 1, further comprising:
   displaying a picture of the video data.

10. An apparatus configured to decode video data, the apparatus comprising:
    a memory configured to store the video data; and
    one or more processors implemented in circuitry and in communication with the memory, the one or more processors configured to:
       determine that a reference picture resampling (RPR) mode is enabled;
       determine not to apply a template-based inter prediction technique to the video data based on the RPR mode being enabled; and
       decode the video data using inter prediction without applying the template-based inter prediction technique, wherein the inter prediction is a merge mode, and wherein the one or more processors are further configured to:
          construct a merge candidate list for a block of the video data, wherein to construct the merge candidate list, the one or more processors are configured to prune the merge candidate list by excluding merge candidates from the merge candidate list that have at least one reference picture that is a different size than a current picture of the video data; and
          decode the block of the video data using the merge candidate list.

11. The apparatus of claim 10, wherein the template-based inter prediction technique is local illumination compensation (LIC).

12. The apparatus of claim 11, wherein to decode the video data without applying the template-based inter prediction technique, the one or more processors are further configured to:
    not apply LIC to an inter prediction hypothesis of the video data.

13. The apparatus of claim 10, wherein RPR mode is enabled based on a reference picture for the video data being a different size than a current picture of the video data.

14. The apparatus of claim 10, wherein the merge mode is one of regular merge mode or affine merge mode.

15. The apparatus of claim 14, wherein the one or more processors are further configured to:
    infer a value of a local illumination compensation (LIC) flag based on RPR being used for a reference picture of a current block.

16. The apparatus of claim 10, wherein the inter-prediction is bi-prediction, and wherein the RPR mode is enabled based on at least one reference picture of multiple reference pictures being a different size than a current picture of the video data.

17. The apparatus of claim 10, wherein the template-based inter prediction technique is template matching (TM) prediction.

18. The apparatus of claim 10, further comprising:
    a display configured to display a picture of the video data.

19. A method of encoding video data, the method comprising:
    determining that a reference picture resampling (RPR) mode is enabled;
    determining not to apply a template-based inter prediction technique to the video data based on the RPR mode being enabled; and
    encoding the video data using inter prediction without applying the template-based inter prediction technique, wherein the inter prediction is a merge mode, the method further comprising:
       constructing a merge candidate list for a block of the video data comprising pruning the merge candidate list, wherein pruning the merge candidate list includes excluding merge candidates from the merge candidate list that have at least one reference picture that is a different size than a current picture of the video data; and encoding the block of the video data using the merge candidate list.

20. An apparatus configured to encode video data, the apparatus comprising:

a memory configured to store the video data; and one or more processors implemented in circuitry and in communication with the memory, the one or more processors configured to:

determine that a reference picture resampling (RPR) mode is enabled;

determine not to apply a template-based inter prediction technique to the video data based on the RPR mode being enabled; and encode the video data using inter prediction without applying the template-based inter prediction technique, wherein the inter prediction is a merge mode, and wherein the one or more processors are further configured to:

construct a merge candidate list for a block of the video data, wherein to construct the merge candidate list, the one or more processors are configured to prune the merge candidate list by excluding merge candidates that have at least one reference picture that is a different size than a current picture of the video data; and encode the block of the video data using the merge candidate list.

* * * * *